US012647443B2

(12) United States Patent
Sand et al.

(10) Patent No.: US 12,647,443 B2
(45) Date of Patent: Jun. 2, 2026

(54) VULNERABILITY SCORING BASED ON ORGANIZATION-SPECIFIC METRICS

(71) Applicant: JPMorgan Chase Bank, N.A., New York, NY (US)

(72) Inventors: Ankur Sand, Cambridge (GB); Martin J Grant, Middletown, DE (US); Luca Baggio, London (GB); Danny Su, Bath (GB); Danica Dometita, Ladenburg, PA (US); Nicholas Campbell, Singapore (SG); Ken K. Wilson, Millington, NJ (US); Dawn David-Swan, Elmont, NY (US); David R. Edwards, Tokyo (JP); Syed Islam, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 161 days.

(21) Appl. No.: 18/393,643

(22) Filed: Dec. 21, 2023

(65) Prior Publication Data

US 2024/0236137 A1     Jul. 11, 2024

Related U.S. Application Data

(60) Provisional application No. 63/435,795, filed on Dec. 28, 2022.

(51) Int. Cl.
H04L 9/40          (2022.01)
(52) U.S. Cl.
CPC ................................ H04L 63/1433 (2013.01)

(58) Field of Classification Search
CPC .............. H04L 63/1433; G06F 21/577; G06F 2221/034; G06F 2221/033
(Continued)

(56) References Cited

U.S. PATENT DOCUMENTS 8,966,639 B1 * 2/2015 Roytman ............ H04L 63/1433
                                                            726/25
8,966,640 B1 * 2/2015 Peddada ............... G06F 21/552
                                                            726/4

(Continued)

*Primary Examiner* — Liang Che A Wang
(74) *Attorney, Agent, or Firm* — Greenblum & Bernstein, P.L.C.

(57)          ABSTRACT

In one example, a non-transitory computer-readable storage medium stores executable program instructions that detect, at a remote device node, vulnerability data associated with an exploitable vulnerability of a target enterprise network; retrieve, by a first local device node, the vulnerability data, which may include a CVSS score, determine, by a second local device node, a vulnerability score $V_T$ by determining a first subscore $V_{T1}$, where the first subscore $V_{T1}$ is based on a Maximized Confidentiality Impact (MCI) metric that is a modified privacy metric to capture the privacy impact of the exploitable vulnerability, where the first subscore $V_{T1}$ is also based on a Maximized Highest Impact (MHI) metric to capture reputation damage based on an outsized single impact attribute, and on a Modified Confidentiality (MC) metric, Modified Integrity (MI) metric and Modified Availability (MA) as provided by CVSS; and remediate the exploitable vulnerability based on the vulnerability score $V_T$.

23 Claims, 11 Drawing Sheets

(58) Field of Classification Search
USPC ........................................................... 726/25
See application file for complete search history.

(56) References Cited

U.S. PATENT DOCUMENTS

| | | | |
|---|---|---|---|
| 8,984,643 B1 * | 3/2015 | Krisher | H04L 63/1408 |
| | | | 726/25 |
| 9,166,999 B1 * | 10/2015 | Kulkarni | G06F 21/31 |
| 11,201,891 B2 * | 12/2021 | Davis | G06F 21/554 |
| 11,470,106 B1 * | 10/2022 | Lin | H04L 63/1433 |
| 11,477,231 B2 * | 10/2022 | Bubshait | G06F 8/65 |
| 11,503,061 B1 * | 11/2022 | Lin | H04L 63/102 |

* cited by examiner

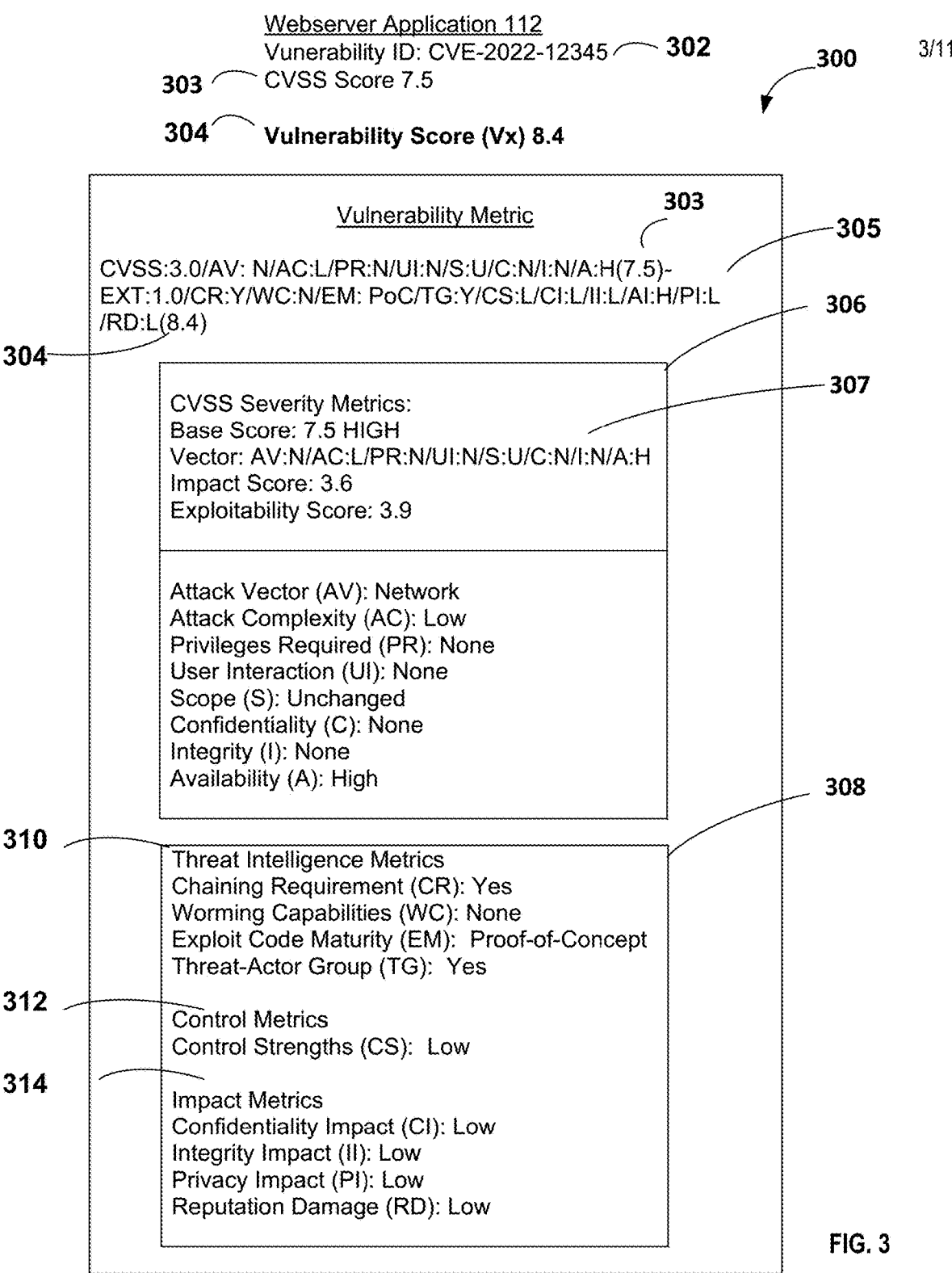

Webserver Application 112
Vunerability ID: CVE-2022-12345 ⌒ 302
303 ⌒ CVSS Score 7.5

304 ⌒ Vulnerability Score (Vx) 8.4

300

3/11

Vulnerability Metric                    303

305

CVSS:3.0/AV: N/AC:L/PR:N/UI:N/S:U/C:N/I:N/A:H(7.5)-
EXT:1.0/CR:Y/WC:N/EM: PoC/TG:Y/CS:L/CI:L/II:L/AI:H/PI:L
/RD:L(8.4)

306

304

307

CVSS Severity Metrics:
Base Score: 7.5 HIGH
Vector: AV:N/AC:L/PR:N/UI:N/S:U/C:N/I:N/A:H
Impact Score: 3.6
Exploitability Score: 3.9

Attack Vector (AV): Network
Attack Complexity (AC): Low
Privileges Required (PR): None
User Interaction (UI): None
Scope (S): Unchanged
Confidentiality (C): None
Integrity (I): None
Availability (A): High

308

310

Threat Intelligence Metrics
Chaining Requirement (CR): Yes
Worming Capabilities (WC): None
Exploit Code Maturity (EM):  Proof-of-Concept
Threat-Actor Group (TG):  Yes

312

Control Metrics
Control Strengths (CS):  Low

314

Impact Metrics
Confidentiality Impact (CI): Low
Integrity Impact (II): Low
Privacy Impact (PI): Low
Reputation Damage (RD): Low

FIG. 3

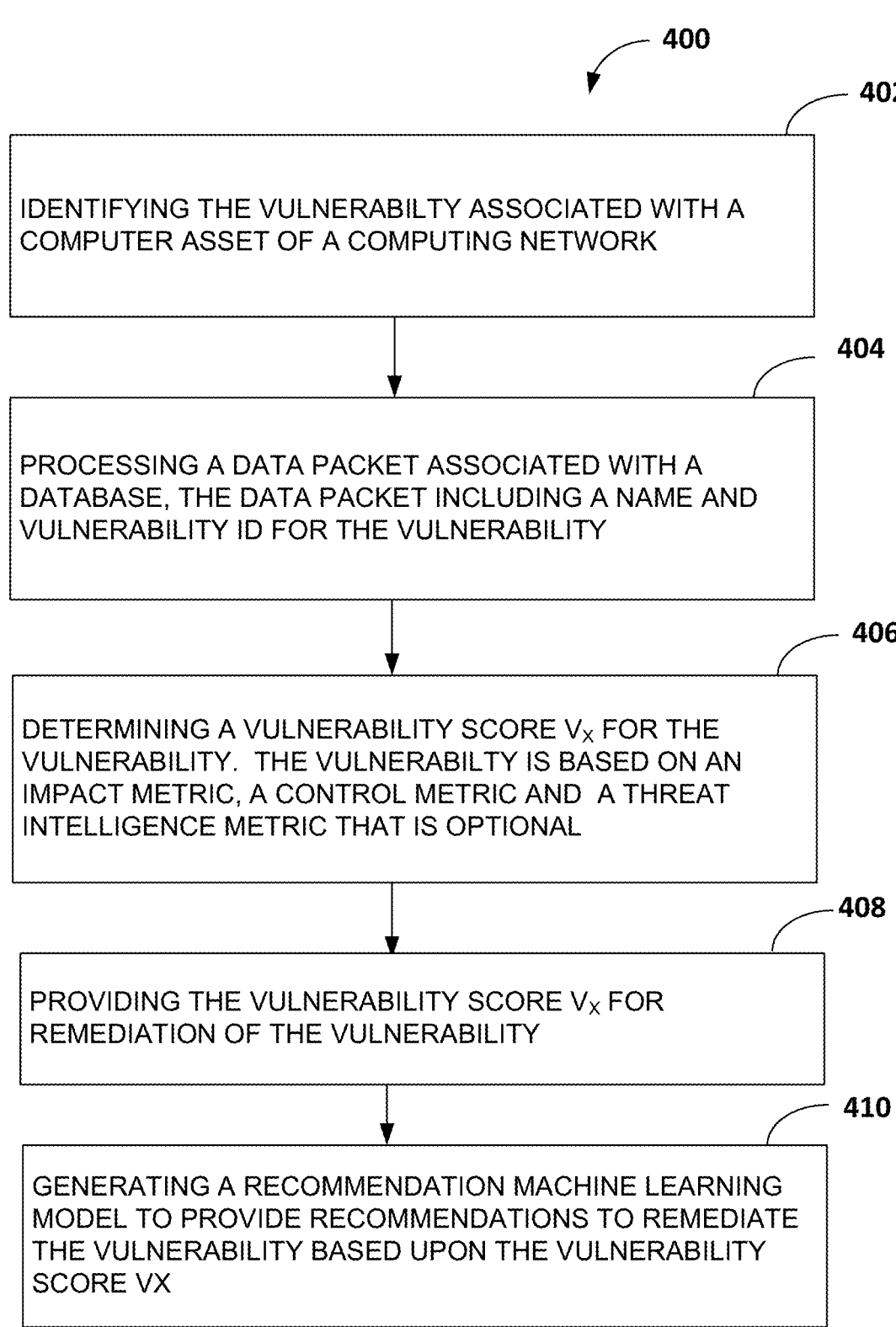

400

402

IDENTIFYING THE VULNERABILTY ASSOCIATED WITH A COMPUTER ASSET OF A COMPUTING NETWORK

404

PROCESSING A DATA PACKET ASSOCIATED WITH A DATABASE, THE DATA PACKET INCLUDING A NAME AND VULNERABILITY ID FOR THE VULNERABILITY

406

DETERMINING A VULNERABILITY SCORE $V_X$ FOR THE VULNERABILTY. THE VULNERABILTY IS BASED ON AN IMPACT METRIC, A CONTROL METRIC AND A THREAT INTELLIGENCE METRIC THAT IS OPTIONAL

408

PROVIDING THE VULNERABILITY SCORE $V_X$ FOR REMEDIATION OF THE VULNERABILITY

410

GENERATING A RECOMMENDATION MACHINE LEARNING MODEL TO PROVIDE RECOMMENDATIONS TO REMEDIATE THE VULNERABILITY BASED UPON THE VULNERABILITY SCORE VX

FIG. 4

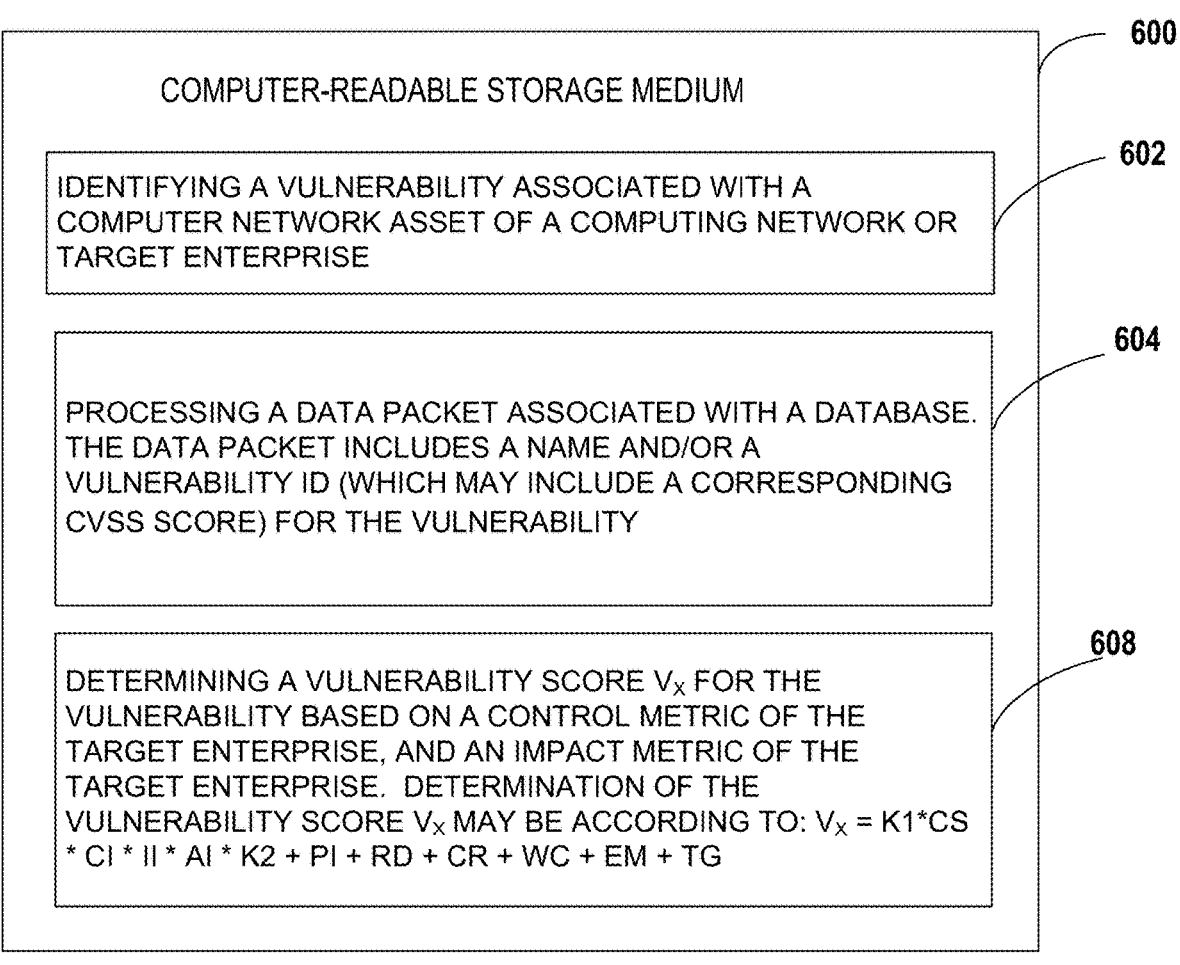

COMPUTER-READABLE STORAGE MEDIUM

IDENTIFYING A VULNERABILITY ASSOCIATED WITH A COMPUTER NETWORK ASSET OF A COMPUTING NETWORK OR TARGET ENTERPRISE

PROCESSING A DATA PACKET ASSOCIATED WITH A DATABASE. THE DATA PACKET INCLUDES A NAME AND/OR A VULNERABILITY ID (WHICH MAY INCLUDE A CORRESPONDING CVSS SCORE) FOR THE VULNERABILITY

DETERMINING A VULNERABILITY SCORE $V_X$ FOR THE VULNERABILITY BASED ON A CONTROL METRIC OF THE TARGET ENTERPRISE, AND AN IMPACT METRIC OF THE TARGET ENTERPRISE. DETERMINATION OF THE VULNERABILITY SCORE $V_X$ MAY BE ACCORDING TO: $V_X$ = K1*CS * CI * II * AI * K2 + PI + RD + CR + WC + EM + TG

FIG. 6A

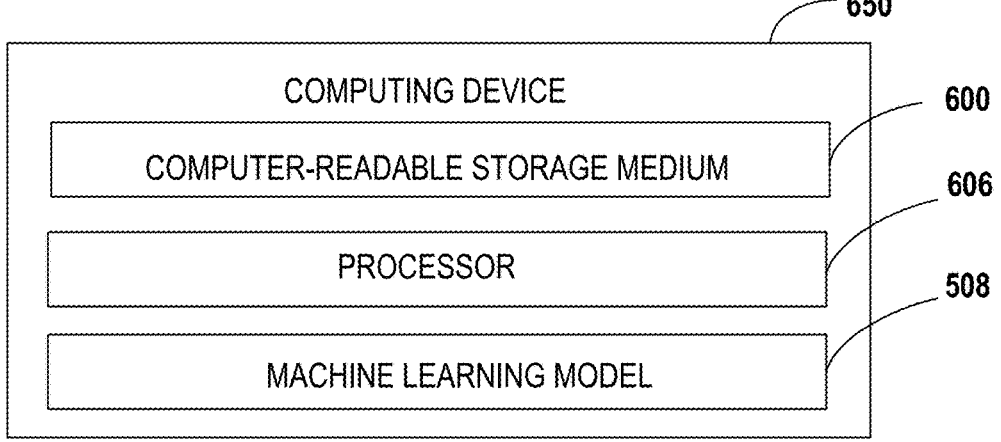

COMPUTING DEVICE

COMPUTER-READABLE STORAGE MEDIUM

PROCESSOR

MACHINE LEARNING MODEL

FIG. 6B

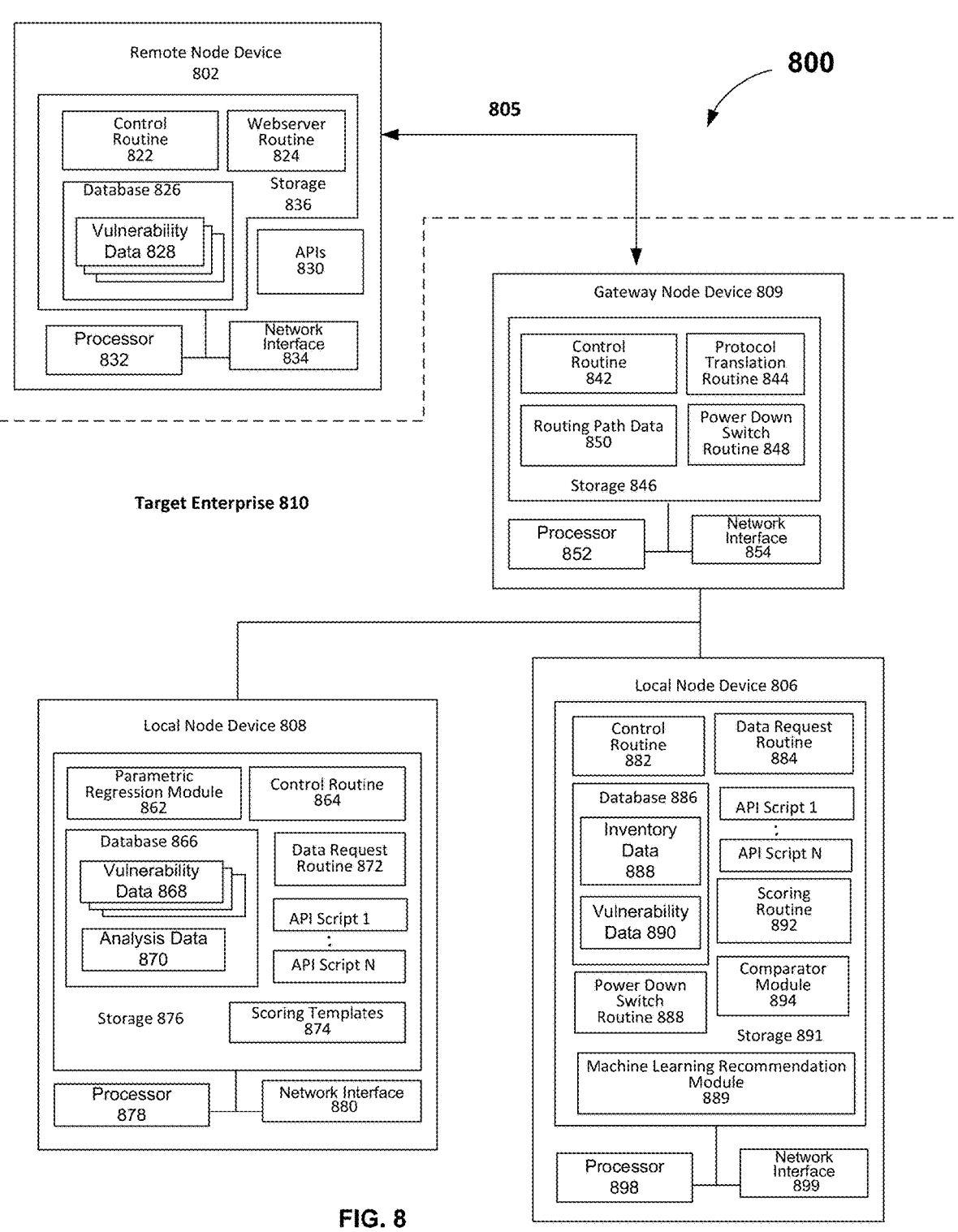

800

805

Remote Node Device
802

Control Routine 822 | Webserver Routine 824

Database 826          Storage 836

Vulnerability Data 828

APIs 830

Processor 832 | Network Interface 834

Target Enterprise 810

Gateway Node Device 809

Control Routine 842 | Protocol Translation Routine 844

Routing Path Data 850 | Power Down Switch Routine 848

Storage 846

Processor 852 | Network Interface 854

Local Node Device 808

Parametric Regression Module 862 | Control Routine 864

Database 866 | Data Request Routine 872

Vulnerability Data 868

API Script 1

Analysis Data 870 | API Script N

Storage 876 | Scoring Templates 874

Processor 878 | Network Interface 880

Local Node Device 806

Control Routine 882 | Data Request Routine 884

Database 886 | API Script 1

Inventory Data 888 | API Script N

Vulnerability Data 890 | Scoring Routine 892

Power Down Switch Routine 888 | Comparator Module 894

Storage 891

Machine Learning Recommendation Module 889

Processor 898 | Network Interface 899

FIG. 8

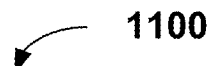

1100

DETECTING, AT A REMOTE DEVICE NODE, VULNERABILITY DATA ASSOCIATED WITH AN EXPLOITABLE VULNERABILITY OF A TARGET ENTERPRISE NETWORK    1102

RETRIEVING, BY A FIRST LOCAL DEVICE NODE VIA A NETWORK INTERFACE THE VULNERABILITY DATA. THE VULNERABILITY DATA COMPRISES, AT LEAST, A CVSS SCORE BASED, AT LEAST IN PART, ON A BASE COMPONENT, A TEMPORAL COMPONENT AND AN ENVIRONMENTAL COMPONENT    1104

DETERMINING, BY A SECOND LOCAL DEVICE NODE OF THE TARGET ENTERPRISE NETWORK, A VULNERABILITY SCORE $V_T$, BASED ON THE VULNERABILITY DATA, FOR THE TARGET ENTERPRISE BY DETERMINING A FIRST SUBSCORE $V_{T1}$ OF THE VULNERABILITY SCORE $V_T$. THE FIRST SUBSCORE $V_{T1}$ IS BASED, AT LEAST IN PART, ON A MAXIMIZED CONFIDENTIALITY IMPACT (MCI) METRIC, AND AT LEAST IN PART ON A MAXIMIZED HIGHEST IMPACT (MHI) METRIC AND BASED, AT LEAST IN PART ON THE ENVIRONMENTAL COMPONENT INCLUDING A MODIFIED CONFIDENTIALITY (MC) METRIC, MODIFIED INTEGRITY (MI) METRIC AND MODIFIED AVAILABILITY (MA) AS PROVIDED BY CVSS.    1106

REMEDIATING THE EXPLOITABLE VULNERABILITY FOR THE TARGET ENTERPRISE BASED, AT LEAST, IN PART ON THE VULNERABILITY SCORE $V_T$    1108

FIG. 11

VULNERABILITY SCORING BASED ON ORGANIZATION-SPECIFIC METRICS

BACKGROUND

Enterprise computing systems and the national computing infrastructure continue to remain the target of cyber threat actors including hackers and crime groups. Many enterprises and national computer systems deploy software applications, hardware and devices for utility and/or to secure the infrastructure and prevent unauthorized system intrusion.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

FIG. 3 illustrates a profile for the known vulnerability CVE-2022-12345 of the webserver application of FIG. 1.

FIG. 4 illustrates a method for determining a vulnerability score Vx for a known vulnerability associated with enterprise network of FIG. 1 according to an example of the present disclosure.

FIG. 6A illustrates example instructions stored on a non-transitory computer-readable storage medium to determine a vulnerability score Vx according to one example of the present disclosure.

FIG. 6B illustrates an example computing device according to the present disclosure.

FIG. 8 illustrates a block diagram of an example distributed processing system for managing exploitable vulnerabilities and determining a vulnerability score $V_T$ according to one example of the present disclosure.

FIG. 11 illustrates an example method for determining a vulnerability score $V_T$ according to examples of the present disclosure.

DETAILED DESCRIPTION

Figure 1:
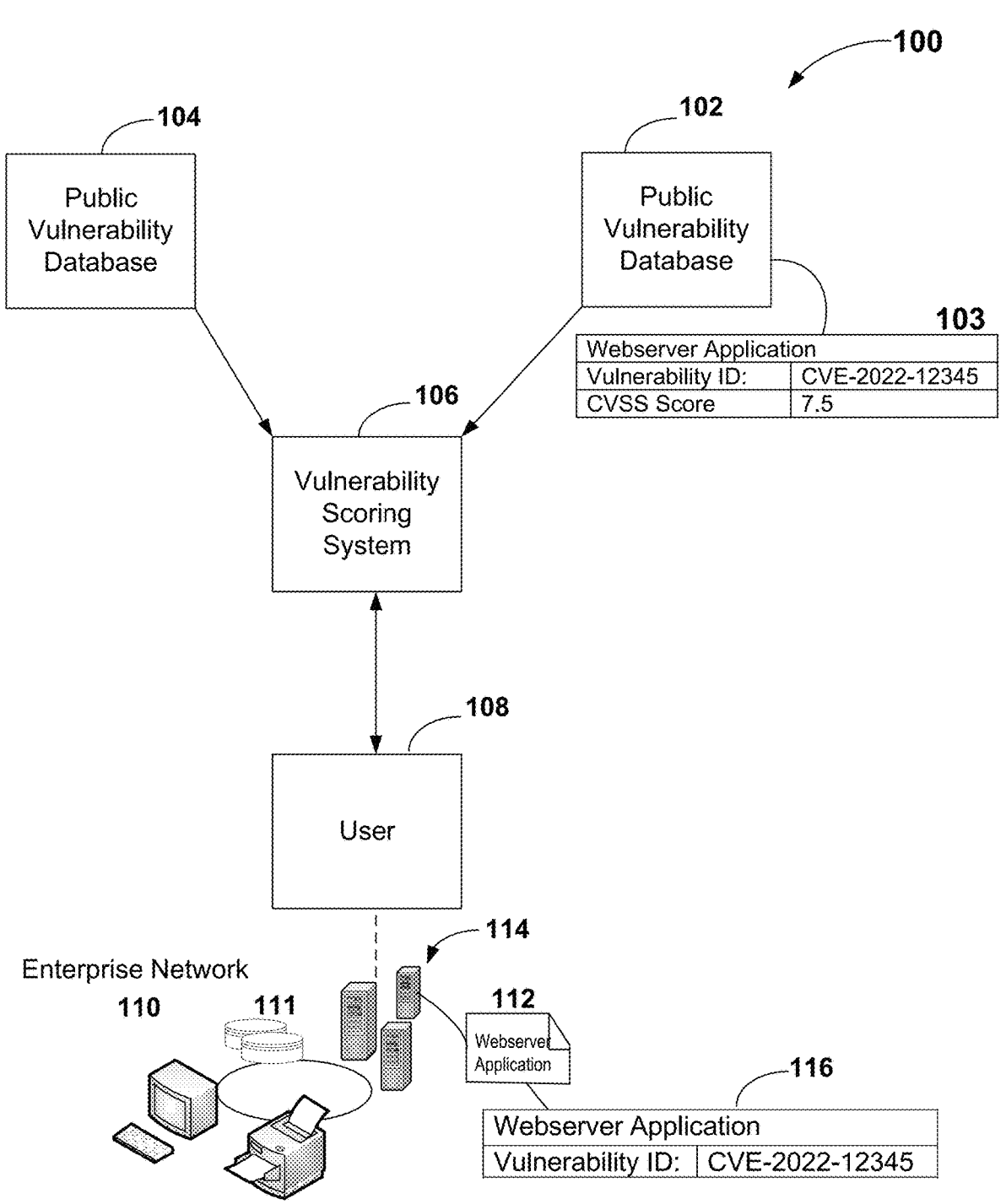
FIG. 1 illustrates a computer vulnerability management platform according to an example of the present disclosure.

A software application, hardware or other device within a computer communication system can be vulnerable. Vulnerability may be defined as a weakness in the software, hardware or underlying infrastructure that can exploited by an attacker. The Common Vulnerability Scoring System or CVSS was launched by the National Infrastructure Advisory Council to provide standardize severity ratings for software vulnerabilities to facilitate network security.

The CVSS provides a standardized score for quantifying the severity of a vulnerability. The CVSS score ranges from 1 through 10, the higher the score, the more the severity of the vulnerability. The CVSS score has three components. The first component is a base metric component, the second component is temporal, and the third is environmental.

The base metric scores indicate the severity of a vulnerability, that severity being based on the intrinsic characteristics of the vulnerability. Base metric scores are usually provided by the organization maintaining the vulnerable product, or a third-party scoring on their behalf. It is typical for only the base metrics to be published as these do not change over time and are common to all environments.

The temporal metrics adjust the base metric score based on factors that change over time, such as the availability of exploit code. The environmental metrics adjust the base and temporal metrics based on a particular computing environment. CVSS scores are commonly used by infosec and vulnerability management teams to compare vulnerabilities, and to prioritize remediation of the vulnerabilities.

The CVSS model, however, has a number of shortcomings. The CVSS model often does not capture an organization's specific threat landscape and impact criteria. Thus, the resulting score can result in limited risk calculation much to the dissatisfaction of regulators and auditors. Many such regulators and auditors conclude that the CVSS model does not facilitate compliance with security standards and regulations. The CVSS model also merely represents the severity of the vulnerability upon occurrence of the vulnerability.

The disadvantages of the CVSS model are not limited to the above. Vulnerability management teams in many organizations only make partial use of the CVSS model because the CVSS model is incomplete. For their assessment and scoring, such teams use only base metric values and do not use temporal or environmental metrics. When necessary, the vulnerability management teams can also override the base metric values to derive updated vulnerability scores. This approach is not in alignment with the CVSS framework and is highly subjective.

Further, the current CVSS framework is not able to express an accurate vulnerability score with the potential to cause significant adverse impacts to many organizations. And, the current CVSS framework is not able to account for known usage of the vulnerabilities by Threat Actors of interest or even the Cyber defense-in-depth posture of many organizations.

Accordingly, example implementations of the present disclosure address the foregoing by providing a computer-readable storage medium with program instructions to determine a vulnerability score for an exploitable vulnerability associated with a target enterprise network based on an extension of the Common Vulnerability Scoring System (CVSS). When executed by a processor, the program instructions are operable to cause operations to detect, at a remote device node, vulnerability data associated with the exploitable vulnerability. Here, the exploitable vulnerability may be a weakness or vulnerability that is potentially harmful to a computing network or computing asset of the target enterprise network.

The operations may further include retrieving, by a first local device node, via a network interface, the vulnerability data including a CVSS score based, at least in part, on a base component, a temporal component and an environmental component. The operations further include determining, by a second local device node of the target enterprise network, the vulnerability score $V_T$ by determining a first subscore $V_{T1}$ based on a Maximized Confidentiality Impact (MCI) metric that is a modified privacy metric specific to the target enterprise to capture the privacy impact of the exploitable vulnerability. Note that MCI is beyond confidentiality metrics C (Confidentiality) and MC (Modified Confidentiality) provided by CVSS.

The first subscore $V_{T1}$ is also based on a Maximized Highest Impact (MHI) metric that captures reputation damage based on a single impact metric with an outsized impact on the target enterprise reputation. The first subscore $V_{T1}$ may also be based on the environmental component including a Modified Confidentiality (MC) metric, Modified Integrity (MI) metric and Modified Availability (MA) as provided by CVSS. After the vulnerability score $V_T$ is determined, the operations may include remediating the exploitable vulnerability based on the vulnerability score $V_T$. In this manner, a more robust prioritization of the exploitable vulnerability for remediation activities can be provided to reduce security risks to the target enterprise.

In one implementation, remediation may include defining a shutdown severity rating of the target enterprise. The shutdown severity rating describes a threshold for shutting down the target enterprise computing network; and if the vulnerability score $V_T$ is equal to the shutdown severity rating, automatically shutting down access to the target enterprise computing network that is impacted by the exploitable vulnerability.

The operations may further include determining a number of subscores based on threat actor scores, a Defense in Depth metric to express compensating layered controls that are in place for the exploitable vulnerability, a Worming Capability metric capturing whether exploited functional autonomous code exists and further based on an executive override/ override score metric among others.

In one implementation, the operations may further include recommending, by a machine learning model, risk ratings against new exploitable vulnerabilities. The present vulnerability model is less subjective and provides consistency and repeatable vulnerability score generation in a manner that can reduce the risk of intrusion to enterprise computing systems and the national computing infrastructure. The vulnerability model of the present disclosure further provides a risk representation that can facilitate compliance with security standards and regulations and is satisfactory to regulators and auditors. The above implementations are further described in the entirety of the disclosure below and more particularly with reference to FIGS. 7 through 11.

FIG. 1 illustrates a computer vulnerability management platform 100 according to a first example of the present disclosure.

In the example of FIG. 1, computer vulnerability management platform 100 can generate a vulnerability score denoted (Vx) for any software or hardware with a known vulnerability. In one implementation, the vulnerability score Vx is based on one of a threat intelligence metric, a control metric and an impact metric that are specific to an organization. In another implementation, the vulnerability score Vx is based on all of the threat intelligence metric, the control metric and the impact metric.

As shown, computer vulnerability management platform 100 can include a public vulnerability database 102, public vulnerability database 104, both of which are communicably coupled to a vulnerability scoring system 106. The vulnerability scoring system 106 can be accessed by a user 108 of an enterprise network 110. Here, enterprise network 110 has deployed a webserver application 112 on one of several webservers 114. The webserver application 112 has a known exploitable vulnerability 116 as shown. Exploitable vulnerability 116 has a Vulnerability ID: CVE-2022-12345 as shown on FIG. 1.

Although not shown, computer vulnerability management platform 100 may include any computer communication system that allows point-to-point communication between two or more end points of all data types including audio, video, etc., and any associated metadata. The communication system may comprise a combination of one or more of the Internet and cloud services for the execution of microservice applications.

In operation, as noted above, webserver application 112 has an exploitable vulnerability 116 with a Vulnerability ID: CVE-2022-12345, and user 108 wishes to generate a vulnerability score Vx for webserver application 112 as deployed within a target enterprise (network) 110. That is, the vulnerability score Vx is based on specific metrics related to the deployment of webserver application 112 on enterprise network 110.

As noted, regulators are beginning to insist on a consistent and objective vulnerability rating to ensure that computer security infrastructure is compliant with applicable regulations. Moreover, enterprises desire an objective vulnerability rating so that the appropriate scope of remediation can be applied. Without the objective and consistent vulnerability metric of the present disclosure, many enterprises will either over remediate or under remediate a vulnerability.

User 108 begins by performing foundational work on enterprise network 110 vis-à-vis the deployment of webserver application 112. More specifically, the control metric, the threat intelligence metric, the impact metric and the cyber security requirements for enterprise network 110 are determined for the identified vulnerability.

In one implementation, determination of the associated metric is performed by a security analyst. A control metric captures the strength of enterprise network 110's compensating controls to detect, protect or mitigate against the given vulnerability. For example, when ports/firewall/proxy-blocking is enabled, the control is rated high. The applicable ratings are discussed in table 4 (see Appendix).

In general, a threat intelligence metric captures known threats and related information specific to enterprise network 110. For example, a threat intelligence metric may include a chaining requirement, whether the attacker requires additional vulnerabilities to compromise enterprise network 110. Impact metrics are organization-specific impacts caused by the exploitable vulnerability 116. For example, whether the vulnerability will cause expose confidential information to unauthorized users.

Once values for a control metric, a threat intelligence metric and an impact metric are obtained, a preexisting CVSS score for the vulnerability is obtained. In this example, exploitable vulnerability 116 has a Vulnerability ID: CVE-2022-12345, and the preexisting CVSS score is 7.5 as shown by record 103. Note that in this example, the pre-existing score is obtained merely for display in the vector string for the vulnerability score Vx.

In one implementation, as will be discussed in detail below, the preexisting CVSS score is automatically retrieved (e.g. via scraping of an associated website) from public vulnerability database 102 or public vulnerability database 104. In another implementation, the preexisting CVSS score is manually obtained from the public vulnerability databases 104 and/or 102 and stored in database 111 of enterprise network 110.

Public vulnerability data base 104 may contain a community-developed list of software and hardware weakness types such as CWE (Common Weakness Enumeration). Public vulnerability database 102 may contain a searchable listing of publicly disclosed vulnerabilities and the assigned CVSS score. As an example, vulnerability database 102 may be the NVD (National Vulnerability Database) that augments the CVE Lists with the CVSS score, additional analysis and information about the vulnerabilities.

After the preexisting CVSS score is obtained, the system generates a vulnerability score Vx based on the control metric, the threat intelligence metric and/or the impact metric. The control metric, the impact metric and the threat intelligence metric are specific to the target enterprise or organization for which the vulnerability score Vx is being generated. The vulnerability score Vx is generated by applying a vulnerability algorithm and applicable ratings for the control metric, the threat intelligence metric and the impact metric as will be further described. The vulnerability algorithm provides a mathematical approximation of all possible valid combinations of the metrics (e.g., control metric, threat intelligence metric, impact metric) ranked by the order of risk levels. For example, a valid combination is CI is high, CS is low, II is low, AI is high, PI is low, RD is high, CR is yes, WC is yes and EM is high. Some combinations are invalid and are identified as such. For example, CI cannot be none when PI is high or CI, II and AI cannot be none.

Each metric value has an associated constant which is used within the formula to generate the vulnerability score based on a particular combination. This constant is identified based on parametric regression tests. In this manner, the present disclosure further provides a risk representation that can facilitate compliance with security standards and regulations and is satisfactory to regulators and auditors.

In one implementation, once generated, the vulnerability score Vx can then be mapped to qualitative severity ratings. The vulnerability scoring system 106 can provide work queue prioritization, and remediation prioritization and tracking, and provide recommendations for risk ratings and compensation control gap uplifting.

Figure 2:
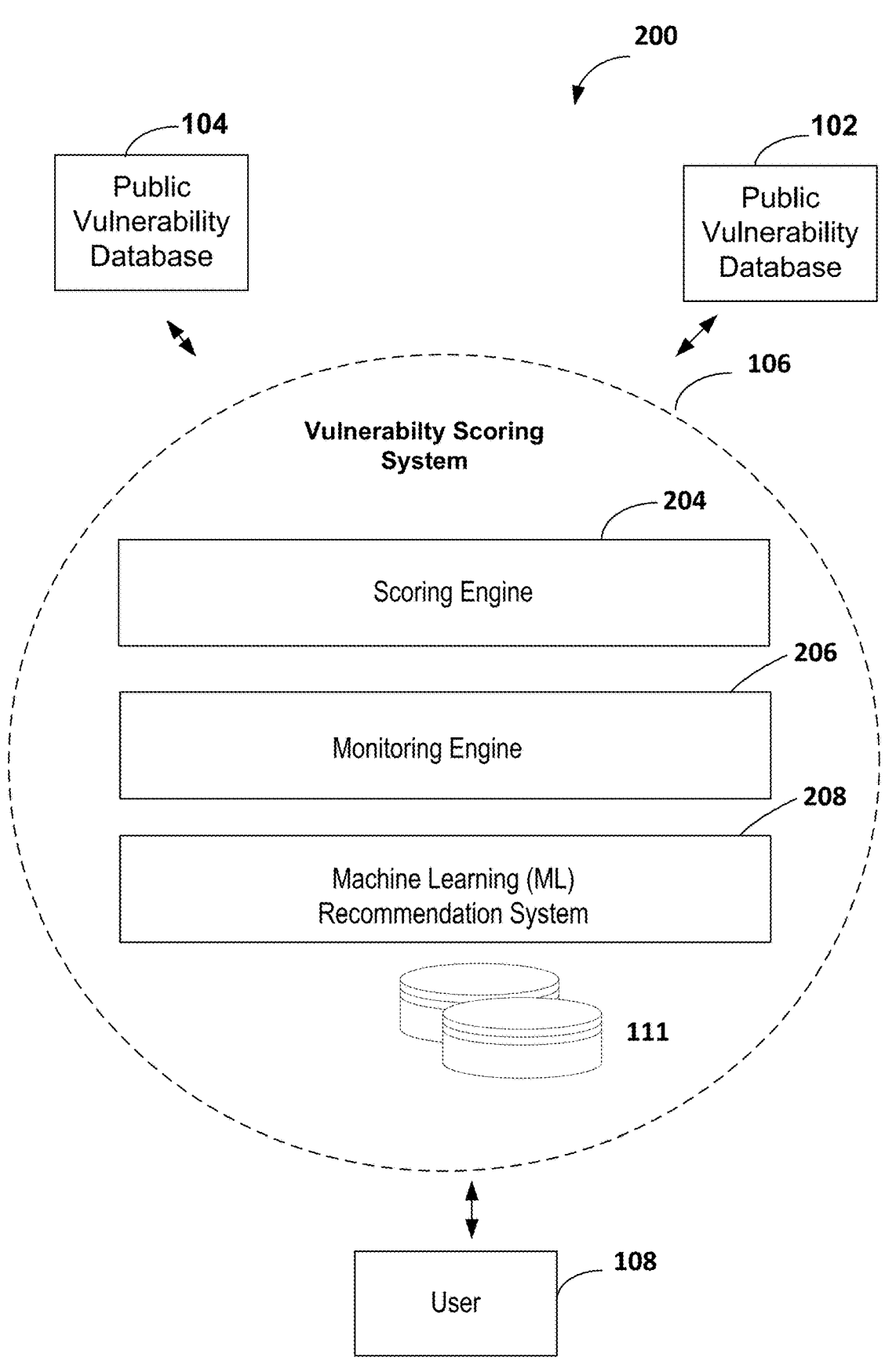
FIG. 2 illustrates components of a vulnerability scoring system of the computer vulnerability management platform of FIG. 1 according to an example of the present disclosure.

FIG. 2 illustrates components of vulnerability scoring system 106 of FIG. 1 according to an example of the present disclosure.

In FIG. 2, vulnerability scoring system 106 may include a scoring engine 204 and a monitoring engine 206. Scoring engine 204 receives vulnerability metric information from public vulnerability database 102, public vulnerability database 104 and/or a database 111 to determine a vulnerability score for any known vulnerability. Vulnerability metric Information may include CVSS base metric, impact metric, control metric and threat intelligence inputs such as exploit code statuses, for example.

Vulnerability metric information that is collected ahead of time may be stored in database 111 in lieu of real-time vulnerability metric information from public sources. As further discussed below, scoring engine 204 executes a vulnerability algorithm that has vulnerability metric information as inputs to generate a vulnerability score.

However, any vulnerability score and its associated rating isn't static. Thousands of vulnerabilities are discovered each year. And, information that impacts such vulnerabilities do change over time. Thus, in FIG. 2, the monitoring engine 206 continuously monitors vulnerability information sources including public vulnerability databases 102 and 104 (FIG. 1) to detect and record changes to vulnerability metric information. In one implementation, monitoring engine 206 monitors websites associated with the public vulnerability databases 102 and 104 to obtain (e.g., via APIs) any changes and updates from the websites. Such changes, updates and vulnerability records may be stored in database 111.

Examples of updated vulnerability information that can be captured include 1) threat Intelligence inputs such as exploit code statuses, whether a vulnerability requires chaining etc., 2) current severity/risk ranking inputs from various preconfigured security tools; 3) latest attack surface inputs, that is, where the assets reside, for example, public facing etc.; 4) compensating controls coverage inputs; and/or 5) news and media outlet source checks (for example, a Twitter posting of vulnerability with PoC (Proof of Concept) or exploit code reference etc.

In FIG. 2, vulnerability scoring system 106 also includes a Machine Learning (ML) recommendation system 208 to provide recommendations that improve vulnerability metric information, which consequently enhances system security. ML recommendation system 208 may include a machine learning model 508 further discussed with reference to FIG. 5A.

An example of a recommendation that may be provided by ML recommendation system 208 is to recommend risk ratings against new vulnerabilities. ML recommendation system 208 may recommend a risk rating of severe against a Denial of Service attack, for example. The recommended risk rating can be based on the historical risk ratings of similar vulnerabilities such as denial of services, privilege escalation etc. and the product and version type of such vulnerabilities.

The recommended risk rating can also be based on the ongoing threat intelligence inputs e.g., PoC/exploit code presence, threat actor attribution, etc. In one implementation, the recommended risk rating is manually validated by a security analyst to determine correctness and completeness. The results are re-entered into ML recommendation system 208 for further refinement.

Another example of a recommendation that can be made by ML recommendation system 208 is compensating control uplifting. A compensating control is technical control (i.e., safeguard or countermeasure) that provides equivalent or comparable protection to an information system in lieu or in addition to an existing system security control.

Enterprise network 110 may have a control strength vector against existing vulnerabilities. However, over time, ML recommendation system 208 can recognize a pattern indicating that the existing control strength is inadequate. For example, ML recommendation engine 208 can recognize that enterprise network 110 doesn't have strong compensating controls against 90% of vulnerabilities that cause denial of service attack, that the existing control strength parameter is rated low, when in fact, it should be rated higher.

As will be further discussed below, the recommendations from ML recommendation system 208 can be based on an AI classification method. In an example, the classification method may correspond to one or more of support vector machines (SVM), random forest (RF) and artificial neural networks (ANN).

FIG. 3 illustrates a profile 300 for the exploitable vulnerability CVE-2022-12345 (shown at 302) of webserver application 112 of FIG. 1.

Specifically, profile 300 shows the vulnerability metric used to determine the vulnerability score Vx (at 304) in accordance with examples of the present disclosure. Here, as can be seen, the vulnerability score Vx that is generated by scoring engine 204 (FIG. 2) is 8.4 while the base CVSS score is 7.5 (at 303).

Thus, the severity and risk of the vulnerability CVE-2022-12345 has increased from a base CVSS score of 7.5 without the present disclosure to a more accurate vulnerability metric Vx of 8.4 that is specific to the target enterprise with the present disclosure. The vulnerability metric Vx of 8.4 is less subjective and increases the security of both enterprise and national security infrastructure because it reflects a more accurate severity/risk of the vulnerability CVE-2022-12345 for the particular target enterprise that is associated with enterprise network 110. As such, in view of the increased severity and risk, enterprise network 110 can allocate more resources to remediating the vulnerability CVE-2022-12345 and avoid any under remediation that can pose a serious security threat to its network.

As shown in the profile of FIG. 3, the generated vulnerability score Vx of 8.4 (at 304) is based on the enhanced vulnerability component 308 based on the present disclosure. The base CVSS metric component 306 is shown for illustration. The enhanced vulnerability component 308 includes threat intelligence metrics 310, control metrics 312 and impact metrics 314.

The threat intelligence metrics 310 include various selectable options, yes for a chaining requirement (CR), none for worming capabilities (WC), Proof-of-Concept for exploit code maturity (EM), and yes for threat-actor group (TG). These parameters and applicable options are further discussed with reference to Table 4 (Appendix).

The control metrics 310 include a single option for control strength (CS) which is low. The impact metrics 314 include a selection of low for confidentiality impact (CI), low for integrity impact (II), low for privacy impact (PI) and low for reputation damage (RD). These parameters and the applicable options are also defined in the Appendix included herein.

The CVSS component metric 306 includes CVSS severity metrics namely the base score of 7.5, impact score of 3.6, exploitability score of 3.9. The attack vector (AV) is network, the attack complexity (AC) is low, privileges required (PR) is none, user interaction (UI) is none, scope (S) is unchanged and confidentiality (C) is none, integrity (I) is none and availability (A) is high. These options are reflected in the Vector string: AV:N/AC:L/PR:N/UI:N/S:U/C:N/I:N/A:H shown at 307, where "AV:N" for example, indicates "Attack Vector: Network."

As shown in FIG. 3, the vector string 305 for the Vx 304 is:

CVSS:3.0/AV: N/AC:L/PR:N/UI:N/S:U/C:N/I:N/A:H (7.5)-
EXT:1.0/CR:Y/WC:N/EM: PoC/TG:Y/CS:L/CI:L/II: L/AI:H/PI:L/RD:L(8.4)

where, "CVSS:3.0" represents the version of CVSS being applied, "/AV: N/AC:L/PR:N/UI:N/S:U/C:N/I:N/A:H(7.5)" is the base CVSS vector string 307, "EXT:1.0/CR:Y/WC: N/EM: PoC/TG:Y/CS:L/CI:L/II:L/AI:H/PI:L/RD:L(8.4)" represents the vector string added by the present disclosure based on the enhanced vulnerability component 308, where "EXT" represents Extension indicating that the string that follows is an extension of the CVSS base metric that is based on the present disclosure.

In general, vulnerability scoring system 106 (FIG. 1/FIG. 2) can compute a vulnerability score Vx ranging from, for example, 0.0 to 10.0, and generate a vector string. The vector text string can indicate the values assigned to each metric to facilitate visibility into the values used for each metric element to obtain the vulnerability score Vx. The vulnerability score Vx, the associated rating, can then be stored in database 111 (FIG. 1).

FIG. 4 illustrates a method 400 for determining a vulnerability score Vx for a known vulnerability associated with enterprise network 110 (FIG. 1) according to an example of the present disclosure.

In this example, the vulnerability score Vx of 8.4 is generated for the known vulnerability CVE-2022-12345 of webserver application 112 of enterprise network 110. As discussed above with reference to FIG. 3, the determination of vulnerability score Vx of 8.4 can be based on a number of metrics.

At block 402 of FIG. 4, method 400 involves identifying the vulnerability CVE-2022-12345 associated with a computer network asset (i.e., webserver application 112) of enterprise network 110. In one implementation, the vulnerability CVE-2022-12345 is identified by monitoring the public vulnerability database 102 (FIG. 1) to detect when the vulnerability associated with webserver application 112 becomes known. The vulnerability may be previously unknown.

However, vulnerability scoring system 106 (FIG. 1) continues to monitor public vulnerability database 102 (i.e., its corresponding webpages) for webserver application 112 information by using APIs, for example. If such information is detected, vulnerability scoring system 106 searches for a CVE identification for the vulnerability. If one is detected, vulnerability scoring system 106 determines that a vulnerability exists.

In another implementation, the vulnerability CVE-2022-12345 can be identified by a security analyst. The security analyst may become aware that a vulnerability now exists for webserver application 112. The security analyst may subscribe to a feed to receive alerts about user-selected vulnerabilities, for example. The security analyst can then identify vulnerabilities and retrieve corresponding vulnerability information such as the CVSS base metrics for the vulnerability. Once retrieved, vulnerability information can be stored on locally on database 111 (FIG. 1).

At step 404, method 400 involves processing a data packet associated with database 111, the data packet including a vulnerability name (e.g., webserver application 112), a vulnerability ID CVE-2022-12345 and a corresponding pre-existing CVSS score 7.5 (at 302 of FIG. 3) for the vulnerability. Specifically, processing may include downloading and receiving the data packets transmitted from a remote server (e.g., the webserver for public vulnerability database 102).

The data packet may include a header and payload. The payload can carry the vulnerability data including a vulnerability name, vector string, and CVSS score for example. The data can then be stored on database 111 for retrieval as proves necessary. When needed, such data may be retrieved by querying database 111.

At block 406, method 400 may include determining the vulnerability score Vx of 8.4 for the vulnerability CVE-2022-12345 based on an impact metric 314, control metric 312 and optional threat intelligence metric 310 of FIG. 3. In one implementation, the vulnerability score Vx is generated based on:

Vx=CVSS:3.0/AV:N/AC:L/PR:N/UI:N/S:U/C:N/I:N/ A:H K1 (CS*CI*II*AI*K2)+PI+RD+CR+WC+EM+TG. In this example, K1 is a first constant determined by parametric regression testing, CS is Control Strength, II is Integrity Impact, AI is Availability Impact, K2 is a second constant determined by parametric regression testing, PI is Privacy Impact, RD is Reputation Damage, WC is Worming Capabilities, EM is Exploit code Maturity and TG is Threat-Actor Group.

Based on parametric regression testing, numerical values (parameters) are assigned to each metric value based on the risk rating of the metric. For example, in Table 1 below, the numerical value 1.72 is assigned to CS if the risk rating is high.

TABLE 1

| | Parameter | | |
| Metric | High | Low | None |
|---|---|---|---|
| Control Strength (CS) | 1.72 | 2.05 | 2.2 |
| Confidentiality Impact (CI) | 1.0 | 0.95 | 0.93 |
| Integrity Impact (II)* | 1.0 | 0.95 | 0.93 |
| Availability Impact (AI)* | 1.0 | 0.95 | 0.93 |
| Privacy Impact (PI) | 1.34 | 1.28 | 1.25 |
| Reputation Damage (RD) | 1.29 | 0.81 | −3.71 |

Here, K1 is 1.34, K2 Organizational Additional Impact Constant is 2.5 and not defined is 0. When threat intelligence metric is selected, the vulnerability score is based on $$Vx = K1(CS*CI*II*AI*K2) + PI + RD + CR + WC + EM + TG.$$

The numeric values assigned to the metric values are shown in Tables 2 and 3.

TABLE 2

| | Parameter | | |
| Metric | High | Low | None |
|---|---|---|---|
| Control Strength (CS) | 1.32 | 2.45 | 2.7 |
| Confidentiality Impact (CI) | 1.0 | 0.95 | 0.93 |
| Integrity Impact (II)* | 1.0 | 0.95 | 0.93 |
| Availability Impact (AI)* | 1.0 | 0.95 | 0.93 |
| Privacy Impact (PI) | 1.34 | 1.28 | 1.25 |
| Reputation Damage (RD) | 1.29 | 0.81 | −3.71 |

TABLE 3

| Metric | Parameter | | | |
|---|---|---|---|---|
| Chaining Requirement (CR) | Yes 0.20 | | No 0.41 | |
| Worming Capabilities (WC) | Yes 0.79 | | No 0.82 | |
| Exploit Code Maturity (EM) | High 0.83 | Functional 0.75 | POC 0.69 | Unproven 0.64 |
| Threat Actor-Group (TA) | Yes 1.53 | 0.93 | No | |

Here, K1 is 0.56, K2 the Organizational Additional Impact Constant is 2.5 and not defined is 0.

Note here that that the control metric (e.g. 312 of FIG. 3) is CS, which is the control strength of the of the target organization's controls against the vulnerability. For example, a Denial of Service attack may have a CS parameter rated low. This low rating indicates that an organization or target enterprise has weak compensating controls against such attacks. The parameters that are assignable to CS are none, low, high or not defined as further discussed in Table 4 (Appendix).

Here, the impact metric (e.g. 314 of FIG. 3) is represented by CI, which attempts to rate the resulting loss in confidential information if the vulnerability is successfully exploited. All impact metrics are applicable to a specific organization.

The values for all impact metrics including CI can be high, low, none or not defined. For example, when CI is low, there is some loss of confidentiality, access to some restricted information is obtained, but the attacker does not have control over what information is obtained.

The impact metric (e.g. 314 of FIG. 3) is also represented by II, integrity impact, which measures an impact to the integrity of information protected by the vulnerability. Integrity can be defined as the trustworthiness and veracity of the protected information. The impact metric is also represented by AI, availability impact that measures an impact on the availability of resources resulting from exploiting the vulnerability. For example, if AI is high, there is a total loss of availability, resulting in the attacker being able to fully deny access to resources in the impacted component.

The impact metric (e.g. 314 of FIG. 3) is also represented by PI, privacy impact, which measures the resulting impact to privacy from exploiting the vulnerability, and RD, which measures the resulting damage to reputation resulting from exploiting the vulnerability. For example, if RD is rated high, a successful exploit of this vulnerability may result in major catastrophic impact including loss of human life, loss of revenue or loss of productivity. The values for impact metrics are further discussed in Table 4 in the Appendix.

The threat intelligence metric (e.g. 310 of FIG. 3) is given by CR, chaining requirement, whether another vulnerability is exploited in addition to the vulnerability, that is, whether an attacker requires additional vulnerabilities as a part of single attack to compromise a host or application. The threat intelligence metric is also given by, WC, worming capabilities, whether the vulnerability has worming capabilities, for example, if 'wormable', any future malware that exploits this vulnerability could propagate from vulnerable computer to vulnerable computer with potential to spread across the globe. The values for CR and WC can be none, yes or not defined as further discussed in Table 4 (Appendix).

The threat intelligence metric is given by EM, exploit code maturity, the likelihood of the vulnerability being attacked. That is, this metric measures the likelihood of the vulnerability being attacked, and is typically based on external threat landscape inputs against the current exploit techniques, exploit code availability, or active, "in-the-wild" exploitation. The values for EM can be not defined, high, functional, proof-of-concept and unproven.

The threat intelligence metric is also given by TG, threat actor-group, capturing threat actor intelligence against the vulnerability. The values for TG can be none, yes or not defined. For example, if TG is yes, there is 0 can be none, yes, significant threat intelligence information that is relevant to the target enterprise is available. The values for threat intelligence metrics are further discussed in Table 4 (Appendix).

An example of application of the above to generating a vulnerability score Vx of 8.4 for vulnerability ID CVE-2022-12345 (which has a CVSS score of 7.5 for comparison, display and/or preservation purposes) is as follows:

$$Vx = K1 * CS * Cl * Il * Al * K2 + PI + RD + CR + WC + EM + TG.$$

$$CVSS:3.0/AV:N/AC:L/PR:N/UI:N/S:U/C:$$

$$N/I:N/A:H(7.5)\_EXT:1.0/CR:Y/WC:N/EM:Proof-of$$

$$Concept/TG:Y/CS:L/Cl:L/Il:L/Al:H/PI:L/RD:L(8.4)]$$

$$8.4 =$$

$$0.56 * 2.45 * 0.95 * 0.95 * 1 * 2.5 + 1.28 + 0.81 + 0.2 + 0.79 + 0.69 + 1.53$$

Referring now to FIG. 4, at block 408, method 400 involves providing the vulnerability score Vx for remediation of the vulnerability CVE-2022-12345. In one implementation, to prevent delay that can compromise computing resource assets, vulnerability scoring system 106 can, based on the vulnerability score, automatically apply patches or fixes to webserver application 112 and/or enterprise network 110. In another implementation, method 400 may simply forward the vulnerability score Vx to a target enterprise to implement remediation.

At block 410, method 400 involves generating a recommendation machine learning model 508 (FIG. 5A) to provide recommendations to remediate the vulnerability based upon the vulnerability score Vx. As discussed above, in one example, the recommendations may provide updated ratings for the vulnerability to facilitate remediation. In an example, the recommendations may update the control strength to facilitate the remediation. The machine learning model 508 is further discussed with reference to FIG. 5A, below.

Figure 5A:
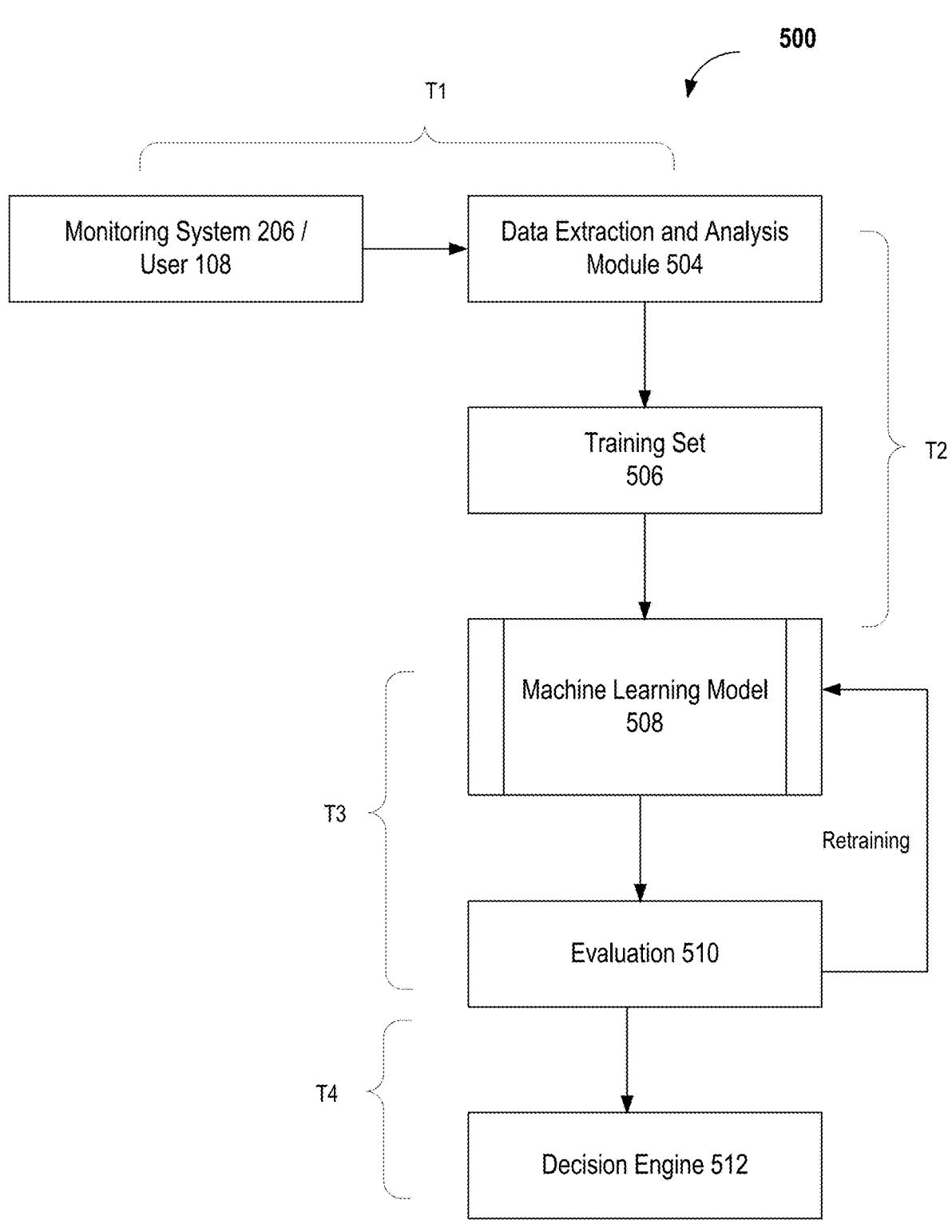
FIG. 5A illustrates a sequence flow diagram to set up a machine learning model according to an example of the present disclosure.

FIG. 5A illustrates a sequence flow diagram 500 to set up machine learning model 508 according to an example of the present disclosure.

At T1, in one implementation, user 108 (FIG. 1) or continuous monitoring system 206 (FIG. 2) feeds historical vulnerability information to the data extraction and analysis module 504. Historical vulnerability information may include past vulnerability information on known vulnerabilities and their CVSS base metrics, types, related product types, etc. At T2, the data extraction and analysis module 504 sanitizes the data and determines specific vulnerability information for use as a training set 506 to create and train machine learning model 508. The training set may include data patterns and sequences that are known to result in expected recommendations.

At T3, the machine learning model 508 is repeatedly evaluated at evaluation 510, and generated recommendations are evaluated, and outcomes adjusted based upon the accuracy of the recommendations. In one example, the machine learning model 508 may learn through training by comparing recommendations to known outcomes. As training progresses, the recommendations of the machine learning model 508 may become increasingly accurate. In one example, a team of security analysts may continuously evaluate the recommendations both to create machine learning model 508 and also to evaluate live recommendations based on the machine learning model 508/ML recommendation system 208.

At T4, once training and setup is complete, and evaluations become satisfactory, the machine learning model 508 is a decision engine 512 that can render decisions for subsequent real-time/nonhistorical vulnerability information to make recommendations. The decision engine 512/machine learning model 508 becomes increasing more accurate at making the correct recommendations.

In an implementation, machine learning model 508 may be based on a classification method. The classification method may correspond to one or more of support vector machines (SVM), random forest (RF) and artificial neural networks (ANN), for example. In one example, an RF classification method can be used. The RF classification method is a collection of decision trees that can predict or make a recommendation based on vulnerability input data. That is, each individual decision tree includes branches that classify vulnerability data according to their characteristics (e.g., type of vulnerability, VCSS score, rating, year of occurrence, product version, ongoing threat intelligence inputs, etc.). In an example, numerous vulnerability data can be processed by the decision tree. Each vulnerability data that is processed follows its specific path through the decision tree. Vulnerability data having the same or similar characteristics will follow the same path within the classification tree.

Running such data through the decision tree thus leads to a learning phase to identify the specific branches of the tree that can be linked to make future recommendations. Such learning phase may take place based on building numerous decision trees with many branches each, including paths that discriminate among different vulnerability data.

Figure 5B:
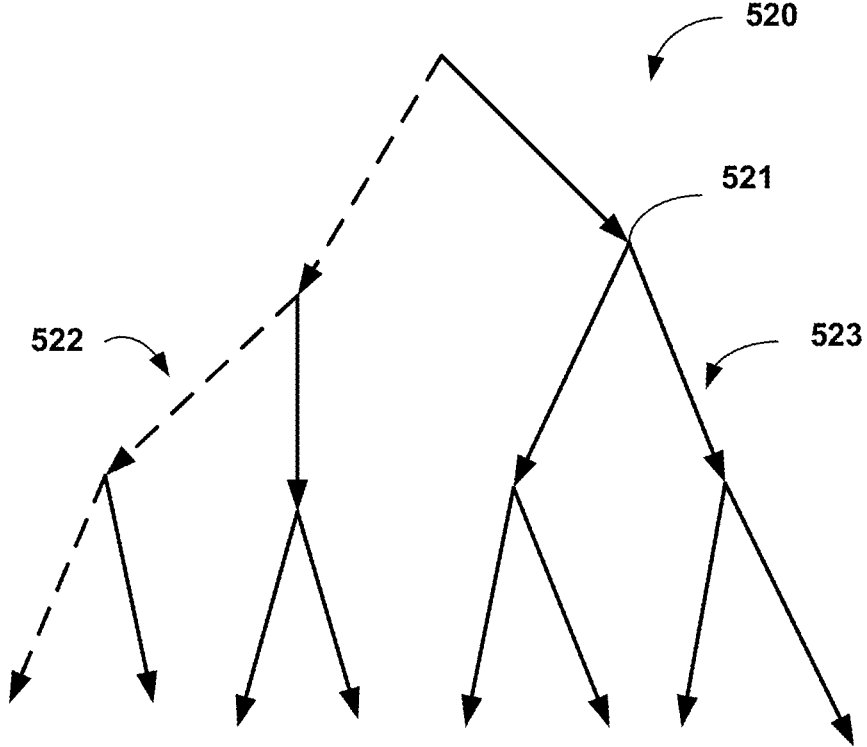

FIG. 5B illustrates a decision tree 520 according to an example of the present disclosure. Path 523 is identified during the learning phase as corresponding to an expected recommendation, path 522 is identified during learning as corresponding to another expected recommendation. For example, path 523 may involve a recommendation based on vulnerability data that has the following characteristics: Denial of Service, with a certain product and version type, a CVSS score of 9 and above, with a critical rating. Vulnerability data that meets such characteristics will proceed along path 523, vulnerability data that does not will proceed along path 522.

At each intersection such as 521 a test such as for example "is the recommendation accurate" is made. This is of course a symbolic representation and RF processing of expected recommendations can be significantly more complex. In an example, RF processing builds a tree, whereby each branch of the tree represents expected recommendations of similar templates, whereby each branch is associated with an expected recommendation. Classification may increase in precision as additional time series data are processed. This progressive process is referred to as the learning phase, whereby RF classification becomes increasingly more accurate at future predictions.

FIG. 6A illustrates example instructions stored on a non-transitory computer-readable storage medium 600 to determine a vulnerability score Vx according to one example of the present disclosure, and FIG. 6B illustrates an example computing device 650 according to the present disclosure.

As shown in FIG. 6A, the non-transitory computer-readable storage medium 600 includes instruction 602 and instruction 604 and instruction 608. Instruction 602 may cause a processor 606 to identifying a vulnerability CVE-2022-12345 associated with a computer network asset (webserver application 112) of enterprise network 110.

Instruction 604 may process a data packet associated with database 111, the data packet including a name (e.g., webserver application 112) and/or a vulnerability ID CVE-2022-12345 (which may have a corresponding preexisting CVSS score 7.5 for comparison purposes) for the vulnerability. Instruction 606 may determine a vulnerability score Vx (at 304 of FIG. 3) for the vulnerability CVE-2022-12345 based on control metric 312 (FIG. 3) of the target enterprise, and impact metric 314 of the target enterprise. Determination of the vulnerability score Vx 304 may be according to: Vx=K1*CS*CI*II*AI*K2+PI+RD+CR+WC+EM+TG as discussed above with reference to FIG. 4.

Although not shown, the non-transitory computer-readable storage medium 600 may include an instruction to determine the vulnerability score Vx based on the impact metric 314, the control metric 312 and the threat intelligence metric 310 according to: Vx=K1*CS*CI*II*AI*K2+PI+RD+CR+WC+EM+TG also discussed above with reference to FIG. 4.

The non-transitory computer-readable storage medium 600 may be any electronic, magnetic, optical, or other physical storage device that stores executable instructions. For example, the non-transitory computer-readable storage medium 700 may be random access memory (RAM), an electrically-erasable programmable read-only memory (EE-PROM), a storage drive, an optical disc, or the like. The non-transitory computer-readable storage medium 600 can be encoded to store executable instructions that cause the processor 606 to perform operations according to examples of the disclosure.

Figure 7:
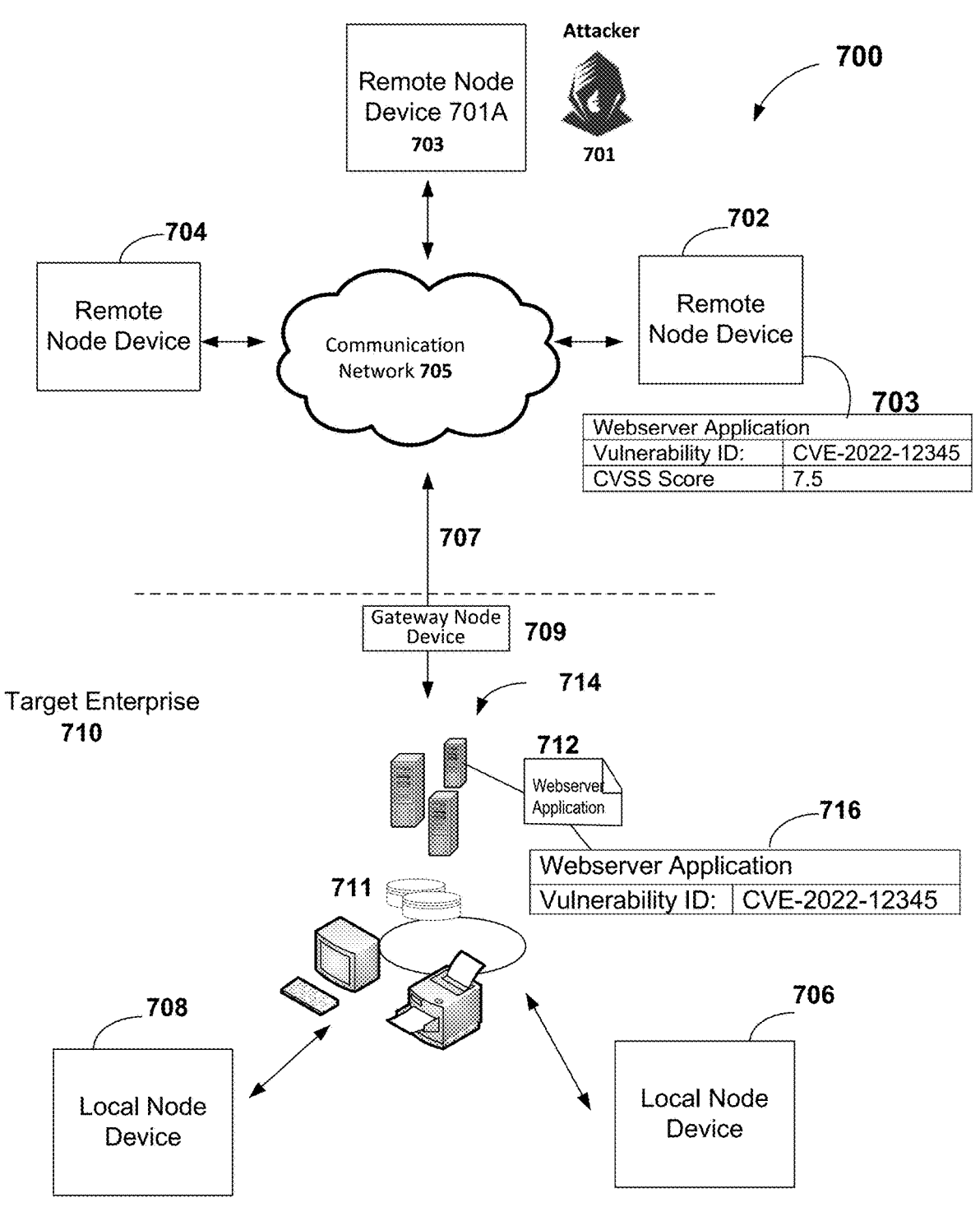
FIG. 7 illustrates a distributed processing system according to an example of the present disclosure.

FIG. 7 illustrates a distributed processing system 700 according to a second example of the present disclosure.

In the example of FIG. 7, distributed processing system 700 generates a vulnerability score denoted (V_T) for any software or hardware having an exploitable vulnerability. In this implementation, the vulnerability score V_T is dependent upon computing a first subscore $V_{T1}$ not hereinbefore known by conventional systems, and where this first subscore $V_{T1}$ is itself computed based upon novel metrics herein disclosed. Specifically, the first subscore $V_{T1}$ is computed based, at least in part, upon a Maximized Confidentiality Impact (MCI) metric and a Maximized Highest Impact (MHI) metric.

Here, MCI is a modified privacy metric specific to target enterprise 710 to capture the privacy impact of the exploitable vulnerability 716 on target enterprise 710. It is noted that MCI is neither confidentiality metrics C (Confidentiality) nor MC (Modified Confidentiality) that are typically provided by CVSS.

MHI, Maximized Highest Impact metric captures the reputation damage that is based on a single impact attribute. The single impact metric has an outsized impact on a reputation associated with the target enterprise.

The vulnerability score V_T and first subscore $V_{T1}$ may also be dependent upon MC, a Modified Integrity (MI) metric and a Modified Availability (MA) which are known metrics that are defined by CVSS. MC, MI and MA are, essentially, modifiers to the CVSS Base metrics and are designed to account for the aspects of target enterprise 710 that can increase or decrease the severity of exploitable vulnerability 716.

As shown, distributed processing system 700 may include a remote node device 702 and a remote node device 704, which can be computing devices with public vulnerability databases. Remote node devices 702 and 704 can be communicably coupled to a gateway node device 709 of target enterprise 710. The gateway node device 709 is an access point to receive data packets and transmit the same to the remote node devices. Here, target enterprise 710 has deployed a webserver application 712 on one of several webservers 714. The webserver application 712 has a known exploitable vulnerability 716 with a Vulnerability ID: CVE-2022-12345.

As implied by its name, an exploitable vulnerability 716 may be exploited by a bad actor such as an attacker 701 via an unauthorized remote node device 701A. In the event of a malicious attack by attacker 701, gateway node device 709 may implement a soft-switch-power shutdown that cuts off power to the gateway node device 709 and prevents any and all access to target enterprise 710.

Target enterprise 710 further includes a local node device 708 and a local node device 706. The local node device 708 may be used, for example, to receive and store indications of vulnerability data such as from remote node device 702 and to receive indications of analysis data, from security analysts, regarding vulnerability metrics that are specific to target enterprise 710. Local node device 706 can, without user interaction, detect relevant vulnerability data to compute the vulnerability score V_T according to the present disclosure.

Although not shown, distributed processing system 700 may include any computer communication system that allows point-to-point communication between two or more end points of all data types including audio, video, etc., and any associated metadata. The communication system may comprise a combination of one or more of the Internet and cloud services for the execution of microservice applications.

In operation, generally, as will be further described with reference to FIG. 8, a vulnerability score V_T is to be computed for webserver application 712, which has a known vulnerability with a Vulnerability ID: CVE-2022-12345. The vulnerability data for Vulnerability ID: CVE-2022-12345 is obtained from remote node device 702 for storage and analysis on local node device 708.

As noted, regulators are beginning to insist on a consistent and objective vulnerability rating to ensure that computer security infrastructure is compliant with applicable regulations. Moreover, enterprises desire an objective vulnerability rating so that the appropriate scope of remediation can be applied. Without the objective and consistent vulnerability metric of the present disclosure, many enterprises will either over remediate or under remediate a vulnerability.

The retrieved vulnerability data may include the CVSS base score for Vulnerability ID: CVE-2022-12345. Foundational work is performed to determine the metrics for Vulnerability ID: CVE-2022-12345 that are specific to target enterprise 710. In one example implementation, determination of the network specific metrics may be performed by a security analyst associated with target enterprise 110. Examples of the determined metric values (beyond the base metrics) are MCI, MHI, MC, MI and MA all of which are used to compute the first subscore $V_{T1}$. The metric values (for MCI, MHI, MC, MI and MA) are then retrieved by local node device 706, which then computes the first subscore $V_{T1}$ based on:

$$V_{T1} =$$

$$\begin{cases} \text{Min}(1-[(1-MC\times MCI)\times(1-MI)\times(1-MA)], 0.915) & \text{if, } MHI \neq Y \\ \text{Min}(1-[(1-(\text{Max}(MC\times MCI, MI, MA))^3], 0.915) & \text{if, } MHI = Y \end{cases}$$

where MC is Modified Confidentiality, MI is Modified Integrity, MA is Modified Availability, MCI is Maximized Confidentiality Impact, MHI is Maximized Highest Impact). After the first subscore $V_{T1}$ is computed, additional subscores $V_{T2}$, $V_{T3}$, $V_{T4}$, $V_{T5}$, $V_{T6}$, $V_{T7}$ may be computed as proves necessary to determine the vulnerability score V_T.

After the vulnerability score $V_T$ is computed, the system remediates the exploitable vulnerability 716 for the target enterprise 710 based, at least, in part on the vulnerability score $V_T$. Remediation may be by restructuring or layering security within the system, for example. In one implementation, once generated, the vulnerability score $V_T$ can be mapped to qualitative severity ratings. A severity rating classifies the severity of an exploitable vulnerability and how much of an adverse impact the vulnerability can have. The severity rating may be critical, severe, high, moderate or low. Specifically, in this example, the severity ratings for vulnerability scores are as follows:

TABLE 4

| Vulnerability Score | Severity Rating |
| --- | --- |
| 10 | Critical |
| 9.49-9.99 | Severe |
| 9.0-9.49 | Medium Severe |
| 7.0-8.9 | High |
| 4.0-6.9 | Moderate |
| 0.0-3.9 | Low |

As an example, a vulnerability score of 4.0 would correspond to a "Moderate" severity rating. The ratings can be customized based on the target enterprise's needs.

A particular severity rating may in fact be classified as a shutdown severity rating for target enterprise 710. In one example, the shutdown severity rating describes a threshold for shutting down the target enterprise 710. Thus, if the vulnerability score $V_T$ is falls within the shutdown severity rating, the system automatically shuts down access to target enterprise 710 that is impacted by the exploitable vulnerability. If for example, the shutdown severity rating is "critical" and the vulnerability score $V_T$ is between 9.0-9.99, a soft switch may be triggered to physically disconnect target enterprise 710 from all external networks.

FIG. 8 illustrates a block diagram of an example distributed processing system 800 for managing exploitable vulnerabilities, the distributed processing system 800 incorporating one or more remote node devices 802, a gateway node device 809, a local node device 808 and a local node device 806.

In one implementation, the remote node device 802 may be an NVD database storing vulnerability data, and containing a community-developed list of software and hardware weakness types such as CWE (Common Weakness Enumeration), and may contain publicly disclosed vulnerabilities and the assigned CVSS score.

In an implementation, gateway node device 809 is a 'gate' to a target enterprise (network) 810, and may be a router, switch, server, firewall or any other device/software that enables traffic flow in or out of a network. Gateway node device 809 provides protective functionality to local node device 808 and local node device 806 and can physically shut down access to local node devices 806 and 808 via a soft switch or the like.

In example implementations, the local node device 808 may be utilized by an operator such as a security analyst to analyze, store and transmit vulnerability data. In some implementations, local node device 808 may develop vulnerability scoring routines and test such scoring routines for accuracy. In an implementation, the local device node 806 computes vulnerability scores and sub-scores for selected exploitable vulnerabilities, and may initiate gateway shutdown procedures as proves necessary.

Turning now to remote node device 802, the device may incorporate one or more of, a processor 832, a storage 836, and a network interface 834. The storage 836 may store a control routine 822, one or more data sets or results data (not shown), a database 826 storing vulnerability data 828, and APIs 830. The control routine 822 may incorporate a sequence of instructions operative on the processor 832 to implement logic to perform various functions, at least partially in parallel with the processor 832 and other processors of the distributed system. In executing the control routine 822, the processor 832 may operate the network interface 834 thereof to receive items of data and to transmit same to local node devices 806 and 808 via network 805 and gateway node device 809.

The control routine 822 in conjunction with a webserver routine 824 may cause the display of a website in which indications of vulnerability information are displayable and available for retrieval. An operator via a search box displayed on the website may transmit a query to database 826, responsive thereof, vulnerability data 828 provides vulnerability information including a product name, vendor name, CVE, vulnerability ID, etc. Further, executing the control routine 822, the processor 832 may provide APIs (Application Programming Interfaces) or respond to API calls to provide such vulnerability information.

The gateway node device 809 may include one or more of, a processor 852, a storage 846, and a network interface 854. The storage 846 may store a control routine 842, a protocol translation routine 844, routing path data 850 and power down switch routine 848. The control routine 842 may incorporate a series of instructions that cause the processor 852 to implement logic to perform a number of functions. Such functions may be parallel-processed with other processors.

When the control routine 842 is executed, the processor 852 may operate the network interface 854 thereof to receive items of data and to transmit the same to local node devices 806 and 808, and via network 805, to transmit and receive from remote node device 802. The control routine 822 in conjunction with a protocol translation routine 844 may cause translations of a differing protocol with which data is received to be consistent with that of target enterprise 810.

In addition to protocol translation, control routine 842 and a data routing routine (not shown) may use the routing path data 850 stored in storage 846 to select the appropriate path and direct data to the correct node, as will be further described below. The control routine 842 and a power down switch routine 848 may be operative to cause processor 852 to engage a soft-switch to power down gateway node device 809 in the event of a malicious attack on the system. In lieu or in addition to disengaging device 809, the power down switch routine may be operative to power down one or more routers (not shown) that segregate target enterprise 810 into separate networks. For example, local node device 808 and local node device 806 may be connected to a single router that to control traffic to the devices, and can be disengaged during an attack.

Turning now to local node device 808, this device may incorporate one or more of, a processor 878, a storage 876, and a network interface 880. The storage 876 may store a parametric regression module 862, a control routine 864, a database 866 that stores both vulnerability data 868 and analysis data 870, a data request routine 872, one or more API Scripts 1 . . . N, and scoring templates 874. The control routine 864 may include instructions or instructions sets causing the processor 878 to implement logic to perform various functions, individually or in parallel with other processors.

In executing the control routine 864, the processor 878 may operate the network interface 880 thereof to receive items of data and to transmit same to local node device 806 and remote node device 802 via gateway node device 809 and network 805. Execution of the control routine 864 in conjunction with data request routine 872 is operative to cause processor 878 to select one of API Script 1 . . . N to initiate a vulnerability data request from remote node device 802, and upon receipt, the vulnerability data is stored as vulnerability data 868. Vulnerability data 868 may include CVSS scores that are calculated based, at least in part, on a base component, a temporal component and an environmental component. Analysis of the vulnerability data by security analysts may result in the storage of analysis data 870, from which scoring templates 874 may be developed.

Turning now to local node device 806, the device may incorporate one or more of, a processor 898, a storage 891, and a network interface 899. The storage 891 may store a control routine 882, a data request routine 884, a database 886 storing inventory data 888 and vulnerability data 890, a power down switch routine 888, a machine learning recommendation module 889, API scripts 1 . . . N, a scoring routine 892, a comparator module 894.

The control routine 882 may incorporate a sequence of instructions operative on the processor 898 to implement logic to perform various functions, at least partially in parallel with the processor 898 and other processors of the distributed system. In executing the control routine 882, the processor 898 may operate the network interface 899 thereof to receive items of data and to transmit same to local node device 808 and remote node device 802 via gateway node device 809 and network 805.

The control routine 882 in conjunction with data request routine 884 are operative on processor 898 to select one of API Script 1 . . . N to initiate a vulnerability data request from remote node 802, the selected API script may check inventory data 888 to determine that the vulnerability request only covers products or vendors in use by target system 810, and upon receipt the vulnerability data is stored in database 886 as vulnerability data 890.

In operation, generally, distributed processing system 700 operates to generate a vulnerability score $V_T$ for any known exploitable vulnerability by initially developing scoring templates/algorithms/formulas that are then stored at scoring templates 874 of storage 876. A scoring template might be a vulnerability score generating algorithm, formula or the like for generating vulnerability scores that are created and subject to extensive testing by security analysts.

This initial development begins at local node device 808. Control routine 864 and data request routine 872 are operative to cause processor 878 to initiate a vulnerability data request directed at remote node device 802. The vulnerability data request can be for a published list of CVEs for example.

The vulnerability data request is executed by one of API script 1 . . . N. In this example, each API script 1 . . . N may use the HTTP GET method for the vulnerability data request, which is transmitted by gateway node device 809 using its routing path data 850 to direct the request to remote node device 802. The vulnerability data request is itself directed to one of APIs 830 of remote node device 802, each of which has a unique base URL. In some implementations, parameters can be added to the URL query to filter requests for specific information. It is noted that parameters may passed to the API in the URL while API keys are passed in the request header. In response to the vulnerability data request, one of APIs 308 then returns the vulnerability data as payload data in the body of the response to local node device 808. Upon receipt, the vulnerability data is stored in vulnerability data 868 of database 866.

Security analysts then analyze and use this vulnerability data for developing and testing vulnerability scoring algorithms and templates. Missing from the CVE vulnerability data are needed metrics specific to many target enterprises. As previously noted, current CVE information uses CVSS metrics for calculation of scores. However, the CVSS metrics do not account for the novel metrics provided for by the present disclosure. The following tables discuss the metrics. Maximized Confidentiality Impact—Privacy (MCI)

The MCI metric customizes the importance/weighting of confidentiality impact within the scoring methodology, and to capture 'privacy' related concerns relevant to the exploitable vulnerability, and placing a higher weighting on confidentiality where appropriate. The MCI metric has three possible values: Undefined, No, or Yes.

TABLE 5

| Metric Value | Description |
| --- | --- |
| Not Defined (X) | Assigning this value indicates there is insufficient information to choose one of the other values, and has no impact on the overall score. |
| No (N) | No privacy concern or additional weighting required for confidentiality attribute. |
| Yes (Y) | Loss of confidentiality is likely to have a 'privacy' impact on the target enterprise or individuals associated with the target enterprise (e.g., employees, customers). |

Maximized Highest Impact—Reputation Damage (MHI)

This metric overcomes the generality imposed in CVSS framework where it places equal weighting on confidentiality, integrity, and availability. In cases, where this generality does not correctly reflect the potential impact of the vulnerability due to an outsized impact from a single impact metric (confidentiality, integrity, availability), this metric can be used to focus the scoring based on the highest rating instead of treating all impact metrics equally.

TABLE 6

| Metric Value | Description |
| --- | --- |
| Not Defined (X) | Assigning this value indicates there is insufficient information to choose one of the other values, and has no impact on the overall score. |
| No (N) | Use standard CVSS formula to calculate Impact by giving equal weighting to all three-impact metrics (confidentiality, integrity, availability). |
| Yes (Y) | Use custom Impact formula that only uses the highest rated impact metric. |

Defense in Depth (DID)

Many target enterprises use a layered approach for its cyber defense posture. Such a layered approach is referred to as DID (Defense in Depth). The DID metric expresses the potential controls that are layered to compensate for the exploitable vulnerability, thus permitting a finer grained prioritization. In other words, DID captures the cyber defense posture of a target enterprise. This metric enables the analyst to express the potential controls that are layered to compensate for the vulnerability in question, thereby allowing a more fine-grained prioritization where appropriate. In general, we expect a reduction in the critical rating of a vulnerability.

TABLE 7

| Metric Value | Description |
| --- | --- |
| Not Defined (X) | Assigning this value indicates there is insufficient information to choose one of the other values, and has no impact on the overall score. |
| None (N) | Assigning this value indicates no known compensating layered controls in place. Choosing this value does not have an impact on the score. |
| Limited (L) | Assigning this value indicates limited known compensating layered controls in place. Choosing this value leads to approx. 3% reduction in the score. |
| Multiple (M) | Assigning this value indicates limited known compensating layered controls in place. Choosing this value leads to approx. 5% reduction in the score. |

Worming Capability (WC)

When target enterprises have a flat network structure, the WC metric of the present disclosure identifies and prioritizes vulnerabilities that are known to be exploited by functional autonomous code. WC captures whether such capabilities exist.

TABLE 8

| Metric Value | Description |
|---|---|
| Not Defined (X) | Assigning this value indicates there is insufficient information to choose one of the other values, and has no impact on the overall score. |
| No (N) | No known functional autonomous code exists. |
| Yes (Y) | Functional autonomous code exists, or no exploit is required (manual trigger) and details are widely available. Exploit code works, or is actively being delivered via an autonomous agent (such as a worm or virus). Network-connected systems are likely to encounter scanning or exploitation attempts. Exploit development has reached the level of reliable, widely available, easy-to-use automated tools. |

Applicability (AP)

Captures whether product, version and configuration are found to be use in the target enterprise.

TABLE 9

| Metric Value | Description |
|---|---|
| Usage Found (UF) | Usage in target enterprise found |
| Product Not Found (PNF) | Product family not found to be in use at target enterprise. |
| Version Not Found (VNF) | Version of the product family that is relevant to the CVE not found to be in use in target enterprise. |
| Configuration Not Found (CNF) | Configuration of the version/product that is relevant to the CVE not found to be in use at target enterprise. |

JAG/JET Association (JA)/Threat Score (TS)

The JA/TS metric captures the intent and capability of known Threat Actors that pose a threat or risk to a target enterprise, and captures known association/usage of vulnerabilities by these Threat Actors.

TABLE 10

| Metric Value | Description |
|---|---|
| Not Defined (X) | Assigning this value indicates there is insufficient information to choose one of the other values, and has no impact on the overall score. |
| No (N) | No known association/usage of vulnerability by JAG/JET. |
| Yes (Y) | Known association/usage of vulnerability by JAG/JET. Additional data to be provided in Threat Score (TS) which is the cumulative (Total) score of all the Threat Actor Scores with known association to the vulnerability. This value enforces the final vulnerability score to be minimum 7.0/v3, while enabling further scaling up depending on the base score and the total Threat Actor Score. |

Executive Override (OR)/Override Score (OS)

The OR/OS metric provides for edge cases where a target enterprise executive can override a generated score and provide an override score.

TABLE 11

| Metric Value | Description |
| --- | --- |
| No (N) | No override needed. |
| Yes (Y) | Executive Override needed. Provision of additional data in Override Score (OS) which is desired score for the vulnerability is required. |

Referring now to FIG. 8, a quantification approach, the current CVSS framework and the parametric regression module 862 are utilized to develop, test and incorporate the new metrics into scoring algorithms/templates for calculating the vulnerability score $V_T$ of a target enterprise. The quantification approach is based on functional equations that are created based on the impact that each input metric is desired to have on the final vulnerability score. The output from the quantification is a score between 0-10 and is also translated to a qualitative score for easier bucketing and organizational remediation activity/prioritization. In other words, the functional form along with the constants were derived based on extensive testing of known vulnerabilities using the parametric regression testing approach. A hybrid approach is also employable which combines the strengths of qualitative and quantitative methods to provide a more comprehensive and objective risk assessment. This approach utilizes rating scales to assess risk likelihood and impact, and then converts these qualitative assessments into numerical values.

The scoring algorithms/templates are developed to align with the CVSS framework. In this implementation, the scoring algorithm for the vulnerability score $V_T$ depends upon eight subscores. The first three subscores are: a target enterprise modified impact subscore $V_{T1}$, a target enterprise modified impact score $V_{T2}$ and a target enterprise modified exploitability score $V_{T3}$, which align with the CVSS 3.1 framework (e.g., Environmental Metric Equations for CVSS 3.1) in that they have a similar structure, similar inputs, same coefficients but are modified and weighted based on the new metrics. The last five subscores are entirely new: a threatscore $V_{T4}$, a target enterprise subscore $V_{T5}$, a target enterprise first extension score $V_{T6}$, a target enterprise second extension score $V_{T7}$ and an executive override score $V_{T8}$.

The target enterprise modified subscore $V_{T1}$ is given by:

$$V_{T1} =$$

$$\begin{cases} \text{Min}(1 - [(1 - MC \times MCI) \times (1 - MI) \times (1 - MA)], 0.915) & \text{if, } MHI \neq Y \\ \text{Min}(1 - [(1 - (\text{Max}(MC \times MCI, MI, MA))^3], 0.915) & \text{if, } MHI = Y \end{cases}$$

where MC is Modified Confidentiality, MI is Modified Integrity, MA is Modified Availability, MCI is Maximized Confidentiality Impact, MHI is Maximized Highest Impact. As noted the above formula aligns with CVSS 3.1, but the CVSS v3.1 framework has a completely different weighting (MC×MCI), has no MCI, no MHI metric, which captures the reputation damage that is based on a single impact attribute, where the single impact metric has an outsized impact on the reputation associated with the target enterprise. CVSS 3.1 assigns equal weight to all three CIA (Confidentiality, Impact, Availability) metrics, which does not always reflect the relative importance of these aspects for a target enterprise.

The CVSS 3.1 Impact metric formula aggregates the numeric values for the three metrics to drive the overall impact metric value that is fed into the Base Metric Value. The maximum CVSS Score of 10 can only be achieved if at least two of the individual impact metrics are rated to have a High impact, that is, an exploitable vulnerability needs to severely impact at least two of the three CIA metrics before it can be given the highest criticality rating.

Given a situation where an exploitable vulnerability is easily exploitable but has a severe impact on only one of the three impact metrics, the maximum possible score under conventional CVSS 3.1 framework is 7.5 which according to NVD Rating Scale is translated to High and not Critical. To overcome this CVSS inherent problem, the present disclosure developed the MHI metric. For example, if an exploitable vulnerability can cause Distributed Denial of services attack again a target enterprise's firewalls or remote VPN services used by employees to perform work activities, which is critical to a target enterprise, the target enterprise will choose this outsized impact as yes as here availability factors has outsized the confidentiality and integrity aspects.

Note that as used herein, the term "outsized impact" or "outsize impact" refers to when a security incident disproportionately impacts one aspect of security, such as availability, over the others, such as confidentiality and integrity. In CVSS v3 framework all the CIA (Confidentiality Impact Availability) values are weighted equally resulting incapability to reflect the true severity of the vulnerability in relation to the target enterprise.

Generally, in information security, the CIA triad refers to the three fundamental principles that underpin secure data management: Confidentiality, Integrity, and Availability. These principles are often considered equally important, but there are situations where the impact of a breach on one principle can disproportionately affect the organization compared to the other two. This is known as the "outsize impact" of a security incident.

A Denial-of-Service (DOS) attack is a prime example of an incident where the Availability principle is disproportionately impacted. A DOS attack aims to overwhelm a system with excessive traffic or requests, rendering it temporarily unavailable to legitimate users. While the confidentiality and integrity of data may not be directly compromised, the inability to access critical systems or services can have a severe impact on a target enterprise's reputation and operations.

The target enterprise modified impact score $V_{T2}$ is given by:

$$V_{T2} =$$

$$\begin{cases} 6.42 \times V_{T1} & \text{if, } S \text{ is unchanged} \\ 7.52 \times (V_{T1} - 0.029) - 3.25 \times (Vx1 \times 0.9731 - 0.02)^{13} & \text{if, } S \text{ is changed} \end{cases}$$

where S is Scope under CVSS, whether or not an attacker can affect a component whose authority is different than the vulnerable component, and where $V_{T1}$ is the target enterprise modified subscore.

The target enterprise modified exploitability score $V_{T3}$ is given by:

$$V_{T3} = 8.22 \times MAV \times MAC \times MPR \times MUI$$

where MAV is Modified Attack Vector, MAC is Modified Attack Complexity and MUI is Modified User Integration according to CVSS.

The threatscore $V_{T4}$ is given by:

$$V_{T4} = \begin{cases} 1 & \text{if, } TA = N \text{ or } TS = 0 \\ 1 + \log_j\left(1 + \sum_i ThreatActorScore_i\right) & \text{if, } TA = Y \text{ and } TS > 0 \end{cases}$$

where $\sum_i ThreatActorScore_i$ denotes the sum across all the target enterprise threat actors that are known to use the exploitable vulnerability, where j is the maximum score for an actor multiplied by the number of actors, and the total Threat Actor Score=Number of threat actors X maximum value for each threat actor, TA is Threat Actor that is of significance to the target enterprise and TS is a Threat Score assigned to a Threat Actor based on any established Threat Actor Scoring Methodology.

The target enterprise subscore $V_{T5}$ is given by:

$$V_{T5} = \begin{cases} 0 & \text{if, } V_{T2} \leq 0 \\ RoundUp\,(Roundup\,(\text{Min }((V_{T2} + V_3) \times \\ V_{T4}, 10)) \times E \times DID) & \text{if, } S \text{ is unchanged} \\ RoundUp\,(Roundup\,(\text{Min }((1.08 \times \\ V_{T2} + V_{T3}) \times V_{T4}, 10)) \times E \times DID) & \text{if, } S \text{ is changed} \end{cases}$$

where $V_{T2}$ is the target enterprise modified impact subscore, $V_{T3}$ is the target enterprise modified exploitability score, $V_{T4}$ is the threatscore, E is Exploit Code Maturity per CVSS, DID is Defense in Depth to express compensating layered controls that are in place for the exploitable vulnerability.

The target enterprise first extension score $V_{T6}$ is given by:

$$V_{T6} = \begin{cases} \text{Min }(V_{T5}, 10) & \text{if, } WC = N \\ \text{Max }(\text{Min }(V_{T5}, 10), 8.5) & \text{if, } WC = Y \end{cases}$$

where $V_{T5}$ is the target enterprise subscore and WC is Worming Capability.

The target enterprise second extension score $V_{T7}$ is given by:

$$V_{T7} = \begin{cases} \text{Min }(V_{T6}, 10) & \text{if, } TA = N \\ \text{Max }(\text{Min }(V_{T6}, 10), 8.5) & \text{if, } TA = Y \end{cases}$$

where $V_{T6}$ is the target enterprise first extension score and TA is Threat Actor.

The executive override score $V_{T8}$ is given by:

$$V_{T8} = \begin{cases} V_{T7} & \text{if, } OR = N \\ OS & \text{if, } OR = Y \text{ and } 0 \leq OS \leq 10 \end{cases}$$

where $V_{T7}$ is the target enterprise second extension score, OS is the override score and OR is executive override. In other words, if a target enterprise executive does not override, the vulnerability score $V_T$ is $V_{T7}$, if the target enterprise executive does override (OR=Y), then an override score between 0 and 10 is to be provided.

Referring to FIG. 8, parametric regression module 862 is operative to extensively test the above formulas/scoring algorithms. Parametric regression testing is a statistical technique used to assess the relationship between one or more independent variables and a dependent variable. It assumes that the relationship between the variables can be described by a specific mathematical function, such as a linear equation. This function is represented by a set of parameters that are estimated from the data. Parametric regression module 862 is operative to perform the following steps:

Data Preparation: Gather the data for the independent and dependent variables. Ensure that the data is clean and free from errors or missing values.

Model Selection: Choose the appropriate parametric regression model based on the expected relationship between the variables. Common models include linear regression, logistic regression, and Poisson regression.

Model Estimation: Estimate the parameters of the chosen model using the data. This involves minimizing the error between the predicted values and the actual data points.

Hypothesis Testing: Perform hypothesis testing to determine if there is a statistically significant relationship between the independent variables and the dependent variable. This involves calculating the test statistic and the corresponding p-value.

Interpretation: Interpret the results of the hypothesis test and the model coefficients to understand the relationship between the variables.

The above formulas/scoring algorithm were extensively tested against over 4500 CVE and security vulnerabilities and the results were acceptable. In FIG. 8, upon completion of testing, the above formulas/scoring algorithms are stored as templates in scoring templates 874.

Local node device 806 can now compute $V_T$ for target enterprises. In one implementation, $V_T$ for new or future exploitable vulnerabilities are computed. In invoking the control routine 882 and the data request routine, the processor 898 may employ any one of API script 1 . . . N to request vulnerability data from remote node device 802. The API request parameters may request, for example, only new data, or it may request specific records.

The requested one of APIs 830 of remote node device 802 responds with the requested data payload. Local node device 806 then compares the vulnerability data to inventory data 888 in storage 891. In one implementation, the vulnerability data is tailored only to the software or hardware products or vendor information that are in use or associated with target enterprise 810. In other words, the vulnerability data is commensurate with inventory products in use by the system. In one implementation, the products/vendors associated with target enterprise 810 may be obtained with a vulnerability scanner. An example of a record of inventory data may be as follows:

TABLE 12

| Vendor | Product Name | Product ID | Installed Location of Product | Known Vulnerabilities ID |
|--------|-------------|-----------|------------------------------|--------------------------|
| Microsoft | Windows X | 12345 | Nodes 806 and 808 | 1290900 |

If the received vulnerability data is commensurate with inventory data, the vulnerability data is stored as vulnerability data 890.

Figure 9:
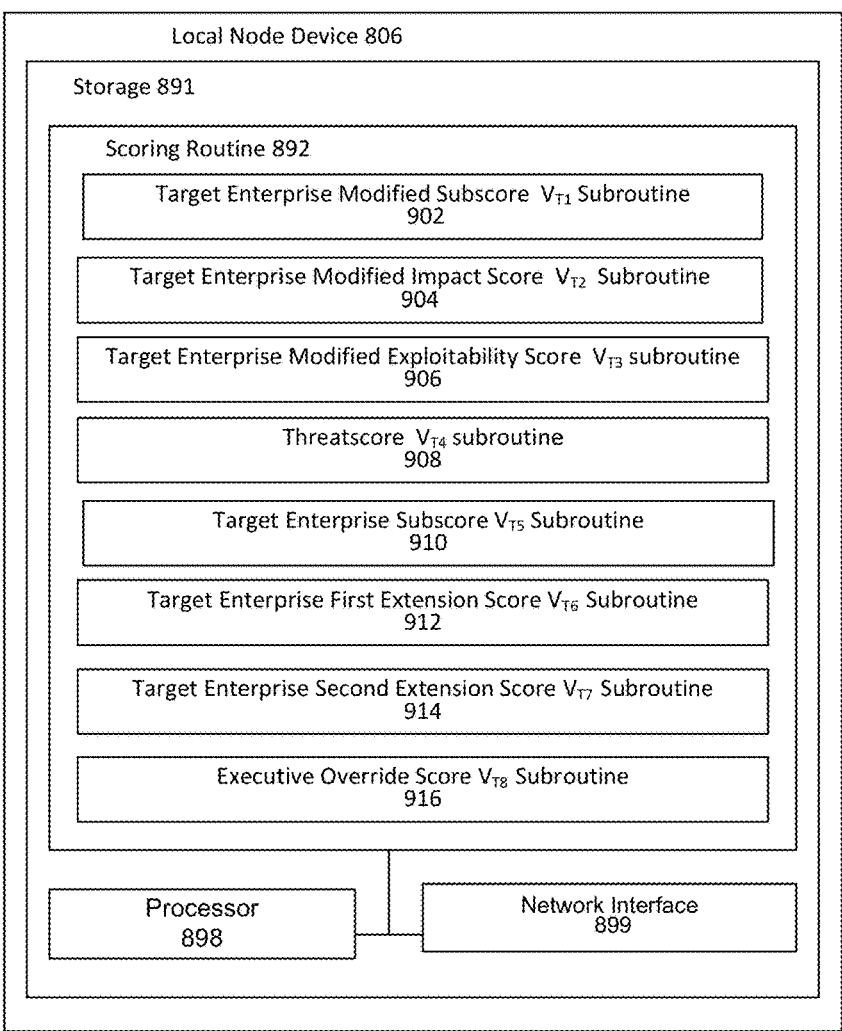
FIG. 9 illustrates subroutines of the scoring routine of FIG. 8 according to one example of the present disclosure.

Local node device 806 then invokes the scoring routine 892, which in concert with control routine 882 invokes a series of subroutines shown in FIG. 9 to compute the vulnerability score $V_T$. In FIG. 9, target enterprise modified subscore $V_{T1}$ subroutine 902 is operative on processor 898 to execute the algorithm:

$$V_{T1} = \begin{cases} \text{Min } (1 - [(1 - MC \times MCI) \times \\ (1 - MI) \times (1 - MA)], 0.915) & \text{if, } MHI \neq Y \\ \text{Min } (1 - [(1 - (\text{Max } (MC \times \\ MCI, MI, MA))^3], 0.915) & \text{if, } MHI = Y \end{cases}$$

Note that the result of $V_{T1}$ depends on two possible values, MHI=Y and MHI!=Y. When MHI=Y, $V_{T1}$ is calculated by taking the maximum of 3 CIA metrics. When MHI!=Y, $V_{T1}$ is calculated by placing equal weight on 3 CIA metrics. Additionally, the MCI metric boosts the value for Confidentiality where the vulnerability is particularly relevant to confidentiality.

After $V_{T1}$ is computed, target enterprise modified impact score $V_{T2}$ subroutine 904 is operative on processor 898 to execute the algorithm:

$$V_{T2} = \begin{cases} 6.42 \times V_{T1} & \text{if, } S \text{ is unchanged} \\ 7.52 \times (V_{T1} - 0.029) - \\ 3.25 \times (V \times 1 \times 0.9731 - 0.02)^{13} & \text{if, } S \text{ is changed} \end{cases}$$

Upon computing $V_{T2}$, target enterprise modified exploitability score $V_{T3}$ subroutine 906 is operative on processor 898 to execute the algorithm:

$$V_{T3} = 8.22 \times MAV \times MAC \times MPR \times MUI$$

Next, threatscore $V_{T4}$ subroutine 908 is operative on processor 898 to execute the algorithm:

$$V_{T4} = \begin{cases} 1 & \text{if, } TA = N \text{ or } TS = 0 \\ \dfrac{1 + \log_j}{\left(1 + \sum_i \text{ThreatActorScore}_i\right)} & \text{if, } TA = Y \text{ and } TS > 0 \end{cases}$$

where j is the maximum score for an actor multiplied by the number of actors, and the total Threat Actor Score=Number of threat actors X maximum value for each threat actor.

The result of $V_{T4}$ is followed by executing target enterprise subscore $V_{T5}$ subroutine 910, which is operative on processor 898 to execute:

$$V_{T5} = \begin{cases} 0 & \text{if, } V_{T2} \leq 0 \\ RoundUp\,(Roundup\,(\text{Min } ((V_{T2} + V_{T3}) \times \\ V_{T4}, 10)) \times E \times DID) & \text{if, } S \text{ is unchanged} \\ RoundUp\,(Roundup\,(\text{Min } ((1.08 \times \\ V_{T2} + V_{T3}) \times V_{T4}, 10)) \times E \times DID) & \text{if, } S \text{ is changed} \end{cases}$$

Upon computing $V_{T5}$, target enterprise first extension score $V_{T6}$ subroutine 912 is operative on processor 898 to execute the algorithm:

$$V_{T6} = \begin{cases} \text{Min } (V_{T5}, 10) & \text{if, } WC = N \\ \text{Max } (\text{Min } (V_{T5}, 10), 8.5) & \text{if, } WC = Y \end{cases}$$

Next, target enterprise second extension score $V_{T7}$ subroutine 914 is invoked, which is operative on processor 898 to execute the algorithm:

$$V_{T7} = \begin{cases} \text{Min } (V_{T6}, 10) & \text{if, } TA = N \\ \text{Max } (\text{Min } (V_{T6}, 10), 8.5) & \text{if, } TA = Y \end{cases}$$

After $V_{T7}$ is computed, the executive override $V_{T8}$ subroutine 916 is operative on processor 898 to execute the algorithm:

$$V_{T8} = \begin{cases} V_{T7}7 & \text{if, } OR = N \\ OS & \text{if, } OR = Y \text{ and } 0 \leq OS \leq 10 \end{cases}$$

The vulnerability score $V_T$ is now computed based on the executed subroutines above. The vulnerability score $V_T$ is a value between 1 and 10. Depending upon the severity of the vulnerability score $V_T$, the system may remediate the exploited vulnerability. As an example of remediation, a development team can provide a patch or temporary patch to provide a workaround if the development team needs more time. As another remediation example, the vulnerable software or hardware can be removed or replaced with a product from another vendor. Further yet, blocking may be another remediation option. Further yet, shutting down physical access to the network can be another remediation example. But whatever option is selected, the target enterprise team can rely upon the vulnerability score $V_T$ as provided by the present disclosure.

In one implementation, as part of the remediation process, a shutdown severity rating of the target enterprise is predetermined. The shutdown severity rating describes a threshold for shutting down the target enterprise computing network. If the vulnerability score $V_T$ is equal to the shutdown severity rating, the system automatically shuts down access to the target enterprise computing network that is impacted by the exploitable vulnerability.

As described above, the severity ratings for vulnerability scores can be defined. For example, a vulnerability score $V_T$ of 10 can be classified as Critical, a score of 9.0-9.99 can be classified as Severe, etc. In the present implementation, the comparator module 894 is executed to compare the determined vulnerability score $V_T$ to the predetermined threshold score or severity that would result in a shutdown. If an indication is received from comparator module 894 that the vulnerability score $V_T$ meets the threshold level, the control routine 882 in conjunction with the power down switch routine 888 is operative on processor 898 to initiate a power down switch process.

The power shut down switch routine 888 transmits a shut-off message to the power down switch routine 848 of gateway node device 809. In this example, gateway node device 809 is powered by a power switch, which is a passive device. The power down switch routine 848 sends a high signal to a microcontroller, whereupon, the gateway node device 809 is immediately powered off. In this manner, the attacker 701 (FIG. 7) that is imminently employing remote node device 701A to exploit the exploitable vulnerability such as webserver application 716 cannot access the target enterprise to deploy a malicious attack. In one example implementation, in lieu of shutting down the gateway, an alert signal may be sent to the development team as to the criticality of the vulnerability score $V_T$.

Figure 10:
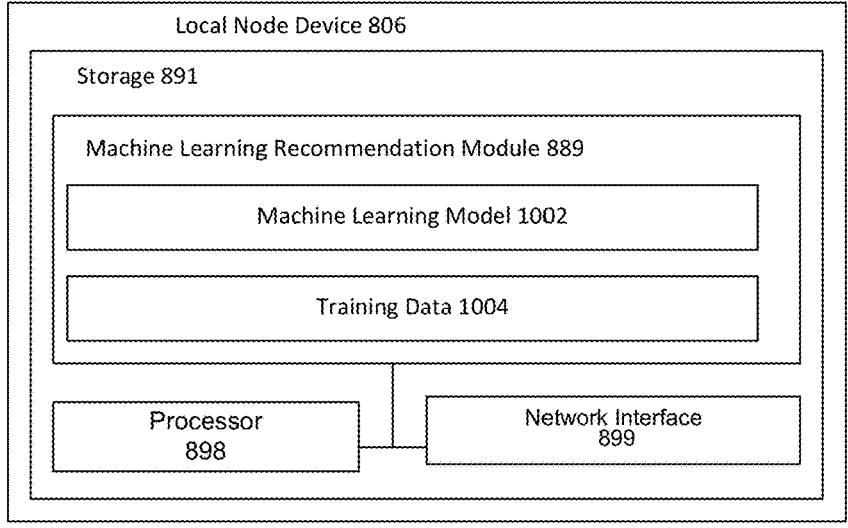
FIG. 10 illustrates an example machine learning recommendation module of FIG. 8.

FIG. 10 illustrates an example machine learning recommendation module 889 of FIG. 8. As shown, the recommendation module 889 includes a machine learning model 1002 and training data 1004 that feeds training data to machine learning model 1002 to improve accuracy of recommendations. In one implementation, execution of the machine learning recommendation module 889 in conjunction with the control routine 882 (FIG. 8) is operative on the processor 898 to recommend risk ratings against new exploitable vulnerabilities.

For example, a risk rating of severe may be recommended against a Denial of Service attack. The recommended risk rating can be based on the historical risk ratings of similar vulnerabilities such as denial of services, privilege escalation etc. and the product and version type of such vulnerabilities that are deployed as training data 1004 to train the machine learning model 1002. The resulting recommendations from machine learning model 1002 can be re-entered as training data 1004 to further refine the system. Other recommendation types can be made by system as discussed elsewhere in the present disclosure.

FIG. 11 illustrates an example method 1100 for determining a vulnerability score $V_T$ according to examples of the present disclosure.

At block 1102, method 1100 includes detecting, at a remote device node (e.g., remote node device 802), vulnerability data associated with an exploitable vulnerability (e.g., webserver application 716 (FIG. 7) of a target enterprise network (e.g., target network 810 (FIG. 8)). The exploitable vulnerability is a weakness or is potentially harmful to a computing network or computing asset of the target enterprise network.

At block 1104, method 1100 involves retrieving, by a first local device node (e.g. local node device 809), via a network interface, such as network interface 880, the vulnerability data. The vulnerability data comprises, at least, a CVSS score based, at least in part, on a base component, a temporal component and an environmental component.

At block 1106, method 1100 involves, determining, by a second local device node (e.g. local device node 806 (FIG. 8)) of the target enterprise network, a vulnerability score $V_T$, based on the vulnerability data, for the target enterprise by determining a first subscore $V_{T1}$ of the vulnerability score $V_T$. The first subscore $V_{T1}$ is based, at least in part, on a Maximized Confidentiality Impact (MCI) metric that is a modified privacy metric specific to a target enterprise to capture the privacy impact of the exploitable vulnerability on the target enterprise.

Note that MCI is beyond confidentiality metrics C (Confidentiality) and MC (Modified Confidentiality) provided by CVSS. The first subscore $V_{T1}$ is also based, at least in part on a Maximized Highest Impact (MHI) metric that captures reputation damage based on a single impact attribute, where the single impact metric has an outsized impact on a reputation associated with the target enterprise. The first subscore $V_{T1}$ is also based, at least in part on the environmental component including a Modified Confidentiality (MC) metric, Modified Integrity (MI) metric and Modified Availability (MA) as provided by CVSS.

At block 1108, method 1100 involves remediating the exploitable vulnerability for the target enterprise based, at least, in part on the vulnerability score $V_T$. Note that the first subscore $V_{T1}$ is by:

$$V_{T1} = \begin{cases} \text{Min } (1 - [(1 - MC \times MCI) \times \\ (1 - MI) \times (1 - MA)], \ 0.915) & \text{if, } MHI \neq Y \\ \text{Min } (1 - [(1 - (\text{Max } (MC \times \\ MCI, MI, MA))^3], \ 0.915) & \text{if, } MHI = Y \end{cases}$$

where MC is Modified Confidentiality, MI is Modified Integrity, MA is Modified Availability, MCI is Maximized Confidentiality Impact, MHI is Maximized Highest Impact). Note also that remediating the exploitable vulnerability for the target enterprise can further include defining a shutdown severity rating of the target enterprise. The shutdown severity rating may define a threshold for shutting down the target enterprise computing network. If the vulnerability score $V_T$ is equal to the shutdown severity rating, method 1100 involves automatically shutting down access to the target enterprise computing network that is impacted by the exploitable vulnerability.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, AngularJS, and Node.js) stack may be employed. In another example, a LAMP (Linux, Apache, MySQL, and PHP) stack may be utilized.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit.

Any suitable programming language can be used to implement the routines of particular examples including C, C++, Java, JavaScript, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

TABLE 13

| No | Metric Name and Explanation | Metric Value | Description |
|----|------------------------------|--------------|-------------|
| | | APPENDIX | |
| | | Threat Intelligence Metrics | |
| 1 | Chaining Requirement (CR): This metric captures the requirement where multiple vulnerabilities are exploited in the course of a single attack to compromise a host or application. | None | The attacker doesn't require additional vulnerabilities as a part of single attack to compromise a host or application. |
| | | YES | The attacker requires additional vulnerabilities as a part of single attack to compromise a host or application. |
| | | Not Defined | Default value; Assigning this value indicates there is insufficient information to choose one of the other values, and has no impact on the overall Score. |
| 2 | Worming Capabilities (WC): This metric is to indicate if a vulnerability comes with worm capabilities, the justification being that we are more likely to see attacks for such vulnerabilities, so they present a more severe threat. | None | Worming Capabilities are not reported. |
| | | YES | The vulnerability is 'wormable', meaning that any future malware that exploits this vulnerability could propagate from vulnerable computer to vulnerable computer in a similar way as the WannaCry malware spread across the globe in 2017. |
| | | Not Defined | Default value; Assigning this value indicates there is insufficient information to choose one of the other values, and has no impact on the overall Score. |
| 3 | Exploit Code Maturity (EM): This metric measures the likelihood of the vulnerability being attacked, and is typically based on external Threat Landscape inputs against the current state of exploit techniques, exploit code availability, or active, "in-the-wild" exploitation. Public availability of easy-to-use exploit code increases the number of potential attackers by including those who are unskilled, thereby increasing the severity of the vulnerability. | Not Defined | Default value; Assigning this value indicates there is insufficient information to choose one of the other values, and has no impact on the overall Score. |
| | | High | 1. Functional autonomous code exists, or no exploit is required (manual trigger) and details are widely available. Exploit code works in every situation, or is actively being actively delivered via an autonomous agent (such as a worm or virus). Network-connected systems are likely to encounter scanning or exploitation attempts. Exploit development has reached the level of reliable, widely available, easy-to-use automated tools. 2. Any vulnerability which has strong TI inputs including news and media. |
| | | Functional | Functional exploit code is available. The code works in most situations where the vulnerability exists. |
| | | Proof-of-Concept | Proof-of-concept exploit code is available, or an attack demonstration is not practical for most systems. The code or technique is not functional in all situations and may require substantial modification by a skilled attacker. |
| | | Unproven | No exploit code is available, or an exploit is theoretical. |

TABLE 13-continued

APPENDIX

| No | Metric Name and Explanation | Metric Value | Description |
|---|---|---|---|
| 4 | Threat-Actor Group (TG): This metric captures the threat actors related Intelligence against the vulnerability. | None | No know threat actor association is reported. |
| | | YES | Significant threat intelligence information available and relevance to organization specific threat landscape is certain. |
| | | Not Defined | Default value; Assigning this value indicates there is insufficient information to choose one of the other values, and has no impact on the overall Score. |
| | | Control Metrics | |
| 1 | Control Strengths (CS): This metric captures the strength of existing organization's Compensating controls against the given vulnerability. | None | No effective controls are available to detect/protect/mitigate against given disclosure. |
| | | Low | Partial controls are available to detect/protect/mitigate against given disclosure. |
| | | High | Multiple level of controls (Adequate) in place to detect/protect/mitigate against given disclosure. Few examples: - Current SEP, IDS/IPS has signature to detect given vulnerability. Given assets/applications sits on tier 2/3 locations and requires 2FA as sign in, etc. |
| | | Not Defined | Default value; Assigning this value indicates there is insufficient information to choose one of the other values, and has no impact on the overall Score. |
| | | Organization Specific Impact Metrics | |
| 2 | Confidentiality Impact (CI) This metric measures the impact to the confidentiality of the information resources managed by a software component due to a successfully exploited vulnerability. Confidentiality refers to limiting information access and disclosure to only authorized users, as well as preventing access by, or disclosure to, unauthorized ones | High | There is a total loss of confidentiality, resulting in all resources within the impacted component being divulged to the attacker. Alternatively, access to only some restricted information is obtained, but the disclosed information presents a direct, serious impact. For example, an attacker steals the administrator's password, or private encryption keys of a web server. |
| | | Low | There is some loss of confidentiality. Access to some restricted information is obtained, but the attacker does not have control over what information is obtained, or the amount or kind of loss is limited. The information disclosure does not cause a direct, serious loss to the impacted component. |
| | | None | There is no loss of confidentiality within the impacted component. |
| | | Not Defined | Default value; Assigning this value indicates there is insufficient information to choose one of the other values, and has no impact on the overall Score. |
| 3 | Integrity Impact (II) This metric measures the impact to integrity of a successfully exploited vulnerability. Integrity refers to the trustworthiness and veracity of information | High | There is a total loss of integrity, or a complete loss of protection. For example, the attacker is able to modify any/all files protected by the impacted component. Alternatively, only some files can be modified, but malicious modification would present a direct, serious consequence to the impacted component. |
| | | Low | Modification of data is possible, but the attacker does not have control over the consequence of a modification, or the amount of modification is limited. The data modification does not have a direct, serious impact on the impacted component. |
| | | None | There is no loss of integrity within the impacted component. |
| | | Not Defined | Default value; Assigning this value indicates there is insufficient information to choose one of the other values, and has no impact on the overall Score. |

TABLE 13-continued

APPENDIX

| No | Metric Name and Explanation | Metric Value | Description |
|----|------------------------------|--------------|-------------|
| 4 | Availability Impact (AI) This metric measures the impact to the availability of the impacted component resulting from a successfully exploited vulnerability | High | There is a total loss of availability, resulting in the attacker being able to fully deny access to resources in the impacted component; this loss is either sustained (while the attacker continues to deliver the attack) or persistent (the condition persists even after the attack has completed). Alternatively, the attacker has the ability to deny some availability, but the loss of availability presents a direct, serious consequence to the impacted component (e.g., the attacker cannot disrupt existing connections, but can prevent new connections; the attacker can repeatedly exploit a vulnerability that, in each instance of a successful attack, leaks a only small amount of memory, but after repeated exploitation causes a service to become completely unavailable). |
| | | Low | Performance is reduced or there are interruptions in resource availability. Even if repeated exploitation of the vulnerability is possible, the attacker does not have the ability to completely deny service to legitimate users. The resources in the impacted component are either partially available all of the time, or fully available only some of the time, but over all there is no direct, serious consequence to the impacted component. |
| | | None | There is no impact to availability within the impacted component. |
| | . | Not Defined | Default value; Assigning this value indicates there is insufficient information to choose one of the other values, and has no impact on the overall Score. |
| 5 | Privacy Impact (PI): This metric captures the potential privacy impact against the given vulnerability. | High | A successful exploit of given vulnerability could result in Major loss of potential impact to PII (Personally identifiable information) and PHI (Protected Health information) disclosure at a great extent. E.g., unmasked SSN, employee information, unmasked card details, etc. |
| | | Low | A successful exploit of given vulnerability could result in loss of potential impact to PII (Personally identifiable information) and PHI (Protected Health information) by disclosure by x number or X percentage. E.g. unmasked SSN, employee information, unmasked card details, etc. |
| | | None | There is no potential impact to PII (Personally identifiable information) and PHI (Protected Health information) disclosure. |
| | | Not Defined | Default value; Assigning this value indicates there is insufficient information to choose one of the other values, and has no impact on the overall Score. |
| 6 | Reputation Damage (RD): This metric captures the potential reputation damage impact against the given vulnerability. | High | A successful exploit of this vulnerability may result in major catastrophic impact including loss of human life. Or, catastrophic loss of revenue or productivity impacting customers. |
| | | Low | A successful exploit of this vulnerability may result in loss of revenue (X Number)) or productivity (X Percentage) to the organization -aligned with risk appetite of the organization. |
| | | None | There is no potential loss of life, physical assets, productivity or revenue. |
| | | Not Defined | Default value; Assigning this value indicates there is insufficient information to choose one of the other values, and has no impact on the overall Score. |

The invention claimed is:

1. A non-transitory computer-readable storage medium with program instructions stored thereon to determine a vulnerability score for an exploitable vulnerability associated with a target enterprise network based on an extension of the Common Vulnerability Scoring System (CVSS), the program instructions which when executed by one or more processors are operable to cause the one or more processors to perform operations comprising:

detecting, at a remote device node, vulnerability data associated with the exploitable vulnerability of the target enterprise network, wherein the exploitable vulnerability is a weakness or is potentially harmful to a computing network or computing asset of the target enterprise network;

retrieving, by a first local device node, via a network interface, the vulnerability data, wherein the vulnerability data comprises, at least, a CVSS score based, at least in part, on a base component, a temporal component and an environmental component;

determining, by a second local device node of the target enterprise network, a vulnerability score $V_T$, based on the vulnerability data, by determining a first subscore $V_{T1}$ of the vulnerability score $V_T$, wherein the first subscore $V_{T1}$ is based, at least in part, on a Maximized Confidentiality Impact (MCI) metric that is a modified privacy metric specific to a target enterprise to capture the privacy impact of the exploitable vulnerability on the target enterprise, wherein MCI is beyond confidentiality metrics C (Confidentiality) and MC (Modified Confidentiality) provided by CVSS, wherein the first subscore $V_{T1}$ is also based, at least in part on a Maximized Highest Impact (MHI) metric that captures reputation damage based on a single impact attribute, wherein the single impact metric has an outsized impact on a reputation associated with the target enterprise, and wherein the first subscore $V_{T1}$ is also based, at least in part on the environmental component including a Modified Confidentiality (MC) metric, Modified Integrity (MI) metric and Modified Availability (MA) as provided by CVSS; and remediating the exploitable vulnerability for the target enterprise based, at least, in part on the vulnerability score $V_T$, wherein the base component indicates a severity of the exploitable vulnerability, wherein the temporal component adjusts the base component based on factors that change over time, wherein the environmental component comprises an adjustment to the base component and the temporal component, and wherein the adjustment is determined by a computing environment.

2. The non-transitory computer-readable storage medium of claim 1 wherein the determining the first subscore $V_{T1}$ comprises utilizing a first piecewise function that is defined as follows:

$$V_{T1} = \begin{cases} \text{Min} (1 - [(1 - MC \times MCI) \times \\ (1 - MI) \times (1 - MA)], \ 0.915) & \text{if, } MHI \neq Y \\ \text{Min} (1 - [(1 - (\text{Max} (MC \times \\ MCI, MI, MA))^3], \ 0.915) & \text{if, } MHI = Y \end{cases}$$

where MC is Modified Confidentiality, MI is Modified Integrity, MA is Modified Availability, MCI is Maximized Confidentiality Impact, MHI is Maximized Highest Impact.

3. The non-transitory computer-readable storage medium of claim 1 wherein remediating the exploitable vulnerability for the target enterprise further comprises:

defining a shutdown severity rating of the target enterprise, wherein the shutdown severity rating describes a threshold for shutting down the target enterprise computing network; and if the vulnerability score $V_T$ is equal to the shutdown severity rating, automatically shutting down access to the target enterprise computing network that is impacted by the exploitable vulnerability.

4. The non-transitory computer-readable storage medium of claim 2 wherein determining the vulnerability score $V_T$ further comprises:

determining a second subscore $V_{T2}$ based, at least in part, on the first subscore $V_{T1}$, the second subscore $V_{T2}$ being defined by a second piecewise function that is defined as follows:

$$V_{T2} = \begin{cases} 6.42 \times V_{T1} & \text{if, } S \text{ is unchanged} \\ 7.52 \times (V_{T1} - 0.029) - \\ 3.25 \times (V \times 1 \times 0.9731 - 0.02)^{13} & \text{if, } S \text{ is changed} \end{cases}$$

where S is Scope under CVSS, whether or not an attacker can affect a component whose authority is different than the vulnerable component.

5. The non-transitory computer-readable storage medium of claim 4 wherein determining the vulnerability score $V_T$ further comprises:

determining a third subscore $V_{T3}$ defined by:

$$V_{T3} = 8.22 \times MAV \times MAC \times MPR \times MUI$$

where MAV is Modified Attack Vector, MAC is Modified Attack Complexity, MPR is Modified Privileges Required, and MUI is Modified User Integration according to CVSS.

6. The non-transitory computer-readable storage medium of claim 5 wherein determining the vulnerability score $V_T$ further comprises:

determining a fourth subscore $V_{T4}$ based on threat actor scores known to use the exploitable vulnerability, the fourth subscore $V_{T4}$ defined by a third piecewise function that is defined as follows:

$$V_{T4} \begin{cases} 1 & \text{if, } TA = N \text{ or } TS = 0 \\ 1 + \log_j \left(1 + \sum_i ThreatActorScore_i \right) & \text{if, } TA = Y \text{ and } TS > 0 \end{cases}$$

where $\sum_i ThreatActorScore_i$ denotes the sum across all the target enterprise threat actors that are known to use the exploitable vulnerability, where j is the maximum score for an actor multiplied by the number of actors, the total Threat Actor Score=Number of threat actors X maximum value for each threat actor, TA is Threat Actor that is of significance to the target enterprise and TS is a Threat Score assigned to a Threat Actor based on the Threat Actor's capability and intent.

7. The non-transitory computer-readable storage medium of claim 6 wherein determining the vulnerability score $V_T$ further comprises:

determining a fifth subscore $V_{T5}$ based, at least in part, on the second subscore $V_{T2}$, the third subscore $V_{T3}$, the fourth subscore $V_{T4}$, wherein the fifth subscore $V_{T5}$ is defined by a fourth piecewise function that is defined as follows:

$$V_{T5} = \begin{cases} 0 & \text{if, } V_{T2} \leq 0 \\ RoundUp\ (Roundup\ (Min \\ ((V_{T2}+V_{T3}) \times V_{T4}, 10)) \times E \times DID) & \text{if, } S \text{ is unchanged} \\ RoundUp\ (Roundup\ (Min \\ ((1.08 \times V_{T2}+V_{T3}) \times V_{T4},10)) \times E \times DID) & \text{if, } S \text{ is changed} \end{cases}$$

where $V_{T2}$ is the second subscore, $V_{T3}$ is the third subscore $V_{T3}$, $V_{T4}$ is the fourth subscore, E is Exploit Code Maturity per CVSS, DID is Defense in Depth to express compensating layered controls that are in place for the exploitable vulnerability.

8. The non-transitory computer-readable storage medium of claim 7 wherein determining the vulnerability score $V_T$ for the exploitable vulnerability further comprises:

determining a sixth subscore $V_{T6}$ based, at least in part, on the fifth subscore $V_{T5}$, and a Worming Capability (WC) capturing whether functional autonomous code that is exploited by the exploited vulnerability exists, wherein the sixth subscore $V_{T6}$ is defined by a fifth piecewise function that is defined as follows:

$$V_{T6} = \begin{cases} Min\ (V_{T5}, 10) & \text{if, } WC = N \\ Max\ (Min\ (V_{T5}, 10), 8.5) & \text{if, } WC = Y \end{cases}$$

where $V_{T5}$ is the fifth subscore and WC is Worming Capability.

9. The non-transitory computer-readable storage medium of claim 8 wherein determining the vulnerability score $V_T$ further comprises:

determining a seventh subscore $V_{T7}$ based, at least in part, on the sixth subscore $V_{T6}$ and the Threat Actor (TA), wherein the seventh subscore $V_{T7}$ is defined by a sixth piecewise function that is defined as follows:

$$V_{T7} = \begin{cases} Min\ (V_{T6}, 10) & \text{if, } TA = N \\ Max\ (Min\ (V_{T6}, 10), 8.5) & \text{if, } TA = Y \end{cases}$$

where $V_{T6}$ is the sixth subscore and TA is Threat Actor.

10. The non-transitory computer-readable storage medium of claim 1, wherein the severity of the exploitable vulnerability is based on intrinsic characteristics of the exploitable vulnerability, wherein when the CVSS score is based on the base component, the temporal component and the environmental component, then the CVSS score comprises the base component, the temporal component and the environmental component, wherein when the MCI is beyond the confidentiality metrics C (Confidentiality) and MC (Modified Confidentiality) provided by CVSS, then the MCI comprises more than the confidentiality metrics C (Confidentiality) and MC (Modified Confidentiality) provided by CVSS, and wherein when the single impact metric has the outsized impact on the reputation associated with the target enterprise then, with respect to other aspects of security, the reputation associated with the target enterprise is disproportionally impacted by the single impact metric.

11. The non-transitory computer-readable storage medium of claim 2 wherein the operations further comprise recommending, by a machine learning model, risk ratings against new exploitable vulnerabilities.

12. A method, by a distributed computing system, for determining a vulnerability score for an exploitable vulnerability associated with a target enterprise network based on an extension of the Common Vulnerability Scoring System (CVSS), the method comprising:

detecting, at a remote device node, vulnerability data associated with the exploitable vulnerability of the target enterprise network, wherein the exploitable vulnerability is a weakness or is potentially harmful to a computing network or computing asset of the target enterprise network;

retrieving, by a first local device node, via a network interface, the vulnerability data, wherein the vulnerability data comprises, at least, a CVSS score based, at least in part, on a base component, a temporal component and an environmental component;

determining, by a second local device node of the target enterprise network, a vulnerability score $V_T$, based on the vulnerability data, for the target enterprise by determining a first subscore $V_{T1}$ of the vulnerability score $V_T$, wherein the first subscore $V_{T1}$ is based, at least in part, on a Maximized Confidentiality Impact (MCI) metric that is a modified privacy metric specific to a target enterprise to capture the privacy impact of the exploitable vulnerability on the target enterprise, wherein MCI is beyond confidentiality metrics C (Confidentiality) and MC (Modified Confidentiality) provided by CVSS, wherein the first subscore $V_{T1}$ is also based, at least in part on a Maximized Highest Impact (MHI) metric that captures reputation damage based on a single impact attribute, wherein the single impact metric has an outsized impact on a reputation associated with the target enterprise, and wherein the first subscore $V_{T1}$ is also based, at least in part on the environmental component including a Modified Confidentiality (MC) metric, Modified Integrity (MI) metric and Modified Availability (MA) as provided by CVSS; and remediating the exploitable vulnerability for the target enterprise based, at least, in part on the vulnerability score $V_T$, wherein the base component indicates a severity of the exploitable vulnerability, wherein the temporal component adjusts the base component based on factors that change over time, wherein the environmental component comprises an adjustment to the base component and the temporal component, and wherein the adjustment is determined by a computing environment.

13. The method of claim 12 wherein the determining the first subscore $V_{T1}$ comprises utilizing a first piecewise function that is defined as follows:

$$V_{T1} = \begin{cases} \text{Min}(1 - [(1 - MC \times MCI) \times \\ (1 - MI) \times (1 - MA)], 0.915) & \text{if, } MHI \neq Y \\ \text{Min}(1 - [(1 - (\text{Max}(MC \times \\ MCI, MI, MA))^3], 0.915) & \text{if, } MHI = Y \end{cases}$$

where MC is Modified Confidentiality, MI is Modified Integrity, MA is Modified Availability, MCI is Maximized Confidentiality Impact, MHI is Maximized Highest Impact).

14. The method of claim 12 wherein determining the vulnerability score $V_T$ further comprises:

determining a second subscore $V_{T2}$ based, at least in part, on the first subscore $V_{T1}$, the second subscore $V_{T2}$ being defined by a second piecewise function that is defined as follows:

$$V_{T2} = \begin{cases} 6.42 \times V_{T1} & \text{if, } S \text{ is unchanged} \\ 7.52 \times (V_{T1} - 0.029) - 3.25 \times \\ (V \times 1 \times 0.9731 - 0.02)^{13} & \text{if, } S \text{ is changed} \end{cases}$$

where S is Scope under CVSS, whether or not an attacker can affect a component whose authority is different than the vulnerable component.

15. The method of claim 14 wherein determining the vulnerability score $V_T$ further comprises:

determining a third subscore $V_{T3}$ defined by:

$$V_{T3} = 8.22 \times MAV \times MAC \times MPR \times MUI$$

where MAV is Modified Attack Vector, MAC is Modified Attack Complexity, MPR is Modified Privileges Required, and MUI is Modified User Integration according to CVSS.

16. The method of claim 15 wherein determining the vulnerability score $V_T$ further comprises:

determining a fourth subscore $V_{T4}$ based on threat actor scores known to use the exploitable vulnerability, the fourth subscore $V_{T4}$ defined by a third piecewise function that is defined as follows:

$$V_{T4} \begin{cases} 1 & \text{if, } TA = N \text{ or } TS = 0 \\ 1 + \log_j\left(1 + \sum_i ThreatActorScore_i\right) & \text{if, } TA = Y \text{ and } TS > 0 \end{cases}$$

where $\Sigma_i$ ThreatActorScore$_i$ denotes the sum across all the target enterprise threat actors that are known to use the exploitable vulnerability, where j is the maximum score for an actor multiplied by the number of actors, and the total Threat Actor Score=Number of threat actors X maximum value for each threat actor, TA is Threat Actor that is of significance to the target enterprise and TS is a Threat Score assigned to a Threat Actor based on the Threat Actor's capability and intent.

17. The method of claim 16 wherein determining the vulnerability score $V_T$ further comprises:

determining a fifth subscore $V_{T5}$ based, at least in part, on the second subscore $V_{T2}$, the third subscore $V_{T3}$, the fourth subscore $V_{T4}$, wherein the fifth subscore $V_{T5}$ is defined by a fourth piecewise function that is defined as follows:

$$V_{T5} = \begin{cases} 0 & \text{if, } V_{T2} \leq 0 \\ RoundUp \, (Roundup \, (\text{Min} \\ ((V_{T2} + V_{T3}) \times V_{T4}, 10)) \times E \times DID) & \text{if, } S \text{ is unchanged} \\ RoundUp \, (Roundup \, (\text{Min} \\ ((1.08 \times V_{T2} + V_{T3}) \times V_{T4}, 10)) \times E \times DID) & \text{if, } S \text{ is changed} \end{cases}$$

where $V_{T2}$ is the second subscore, $V_{T3}$ is the third subscore $V_{T3}$, $V_{T4}$ is the fourth subscore, E is Exploit Code Maturity per CVSS, DID is Defense in Depth to express compensating layered controls that are in place for the exploitable vulnerability.

18. The method of claim 17 wherein determining the vulnerability score $V_T$ for the exploitable vulnerability further comprises:

determining a sixth subscore $V_{T6}$ based, at least in part, on the fifth subscore $V_{T5}$, and a Worming Capability (WC) capturing whether functional autonomous code that is exploited by the exploited vulnerability exists, wherein the sixth subscore $V_{T6}$ is defined by a fifth piecewise function that is defined as follows:

$$V_{T6} = \begin{cases} \text{Min}(V_{T5}, 10) & \text{if, } WC = N \\ \text{Max}(\text{Min}(V_{T5}, 10), 8.5) & \text{if, } WC = Y \end{cases}$$

where $V_{T5}$ is the fifth subscore and WC is Worming Capability.

19. The method of claim 18 wherein determining the vulnerability score $V_T$ further comprises:

determining a seventh subscore $V_{T7}$ based, at least in part, on the sixth subscore $V_{T6}$ and the Threat Actor (TA), wherein the seventh subscore $V_{T7}$ is defined by a sixth piecewise function that is defined as follows:

$$V_{T7} = \begin{cases} \text{Min}(V_{T6}, 10) & \text{if, } TA = N \\ \text{Max}(\text{Min}(V_{T6}, 10), 8.5) & \text{if, } TA = Y \end{cases}$$

where $V_{T6}$ is the sixth subscore and TA is Threat Actor.

20. The method of claim 19 wherein determining the vulnerability score $V_T$ for the exploitable vulnerability further comprises determining an eight subscore $V_{T8}$ defined by a seventh piecewise function that is defined as follows:

$$V_{T8} = \begin{cases} V_{T7} & \text{if, } OR = N \\ OS & \text{if, } OR = Y \text{ and } 0 \leq OS \leq 10 \end{cases}$$

wherein $V_{T7}$ is the seventh subscore, OS is executive score and OR is executive override.

21. The method of claim 12, wherein the severity of the exploitable vulnerability is based on intrinsic characteristics of the exploitable vulnerability, wherein when the CVSS score is based on the base component, the temporal component and the environmental component, then the CVSS score comprises the base component, the temporal component and the environmental component, wherein when the MCI is beyond the confidentiality metrics C (Confidentiality) and MC (Modified Confidentiality) provided by CVSS, then the MCI comprises more than the confidentiality metrics C (Confidentiality) and MC (Modified Confidentiality) provided by CVSS, and wherein when the single impact metric has the outsized impact on the reputation associated with the target enterprise then, with respect to other aspects of security, the reputation associated with the target enterprise is disproportionally impacted by the single impact metric.

22. A distributed system for determining a vulnerability score for an exploitable vulnerability associated with a target enterprise network based on an extension of the Common Vulnerability Scoring System (CVSS), the distributed system comprising:

a remote device node, having a network interface for transmitting and receiving data via a communication network, the remote node device to detect vulnerability data associated with the exploitable vulnerability of the target enterprise network, wherein the exploitable vulnerability is a weakness or is potentially harmful to a computing network or computing asset of the target enterprise network;

a first local device node to retrieve, via a network interface, the vulnerability data, wherein the vulnerability data comprises, at least, a CVSS score based, at least in part, on a base component, a temporal component and an environmental component;

a second local device node having a network interface, of the target enterprise network, to compute a vulnerability score $V_T$, based on the vulnerability data, for the target enterprise by determining a first subscore $V_{T1}$ of the vulnerability score $V_T$, wherein the first subscore $V_{T1}$ is based, at least in part, on a Maximized Confidentiality Impact (MCI) metric that is a modified privacy metric specific to a target enterprise to capture the privacy impact of the exploitable vulnerability on the target enterprise, wherein MCI is beyond confidentiality metrics C (Confidentiality) and MC (Modified Confidentiality) provided by CVSS, wherein the first subscore $V_{T1}$ is also based, at least in part on a Maximized Highest Impact (MHI) metric that captures reputation damage based on a single impact attribute, wherein the single impact metric has an outsized impact on a reputation associated with the target enterprise, and wherein the first subscore $V_{T1}$ is also based, at least in part on the environmental component including a Modified Confidentiality (MC) metric, Modified Integrity (MI) metric and Modified Availability (MA) as provided by CVSS; and the second local device node to remediate the exploitable vulnerability for the target enterprise based, at least, in part on the vulnerability score $V_T$, wherein the base component indicates a severity of the exploitable vulnerability, wherein the temporal component adjusts the base component based on factors that change over time, wherein the environmental component comprises an adjustment to the base component and the temporal component, and wherein the adjustment is determined by a computing environment.

23. The distributed system of claim 22, wherein the severity of the exploitable vulnerability is based on intrinsic characteristics of the exploitable vulnerability, wherein when the CVSS score is based on the base component, the temporal component and the environmental component, then the CVSS score comprises the base component, the temporal component and the environmental component, wherein when the MCI is beyond the confidentiality metrics C (Confidentiality) and MC (Modified Confidentiality) provided by CVSS, then the MCI comprises more than the confidentiality metrics C (Confidentiality) and MC (Modified Confidentiality) provided by CVSS, and wherein when the single impact metric has the outsized impact on the reputation associated with the target enterprise then, with respect to other aspects of security, the reputation associated with the target enterprise is disproportionally impacted by the single impact metric.

* * * * *